(12) United States Patent
Ott et al.

(10) Patent No.: US 11,493,696 B2
(45) Date of Patent: Nov. 8, 2022

(54) FERRULE-LESS FIBER OPTIC CONNECTOR HAVING MULTIPLE OPTICAL FIBERS

(71) Applicant: COMMSCOPE TECHNOLOGIES LLC, Hickory, NC (US)

(72) Inventors: Michael James Ott, Hudson, WI (US); John D. Schmidt, Minneapolis, MN (US)

(73) Assignee: CommScope Technologies LLC, Hickory, NC (US)

( * ) Notice: Subject to any disclaimer, the term of this patent is extended or adjusted under 35 U.S.C. 154(b) by 726 days.

(21) Appl. No.: 16/319,117

(22) PCT Filed: Jul. 20, 2017

(86) PCT No.: PCT/US2017/043158
§ 371 (c)(1),
(2) Date: Jan. 18, 2019

(87) PCT Pub. No.: WO2018/017883
PCT Pub. Date: Jan. 25, 2018

(65) Prior Publication Data
US 2021/0333477 A1    Oct. 28, 2021

Related U.S. Application Data

(60) Provisional application No. 62/419,266, filed on Nov. 8, 2016, provisional application No. 62/383,696, filed on
(Continued)

(51) Int. Cl.
*G02B 6/38* (2006.01)

(52) U.S. Cl.
CPC ........... *G02B 6/3809* (2013.01); *G02B 6/387* (2013.01); *G02B 6/3825* (2013.01); *G02B 6/3879* (2013.01)

(58) Field of Classification Search
CPC .................................................. G02B 6/3809
See application file for complete search history.

(56) References Cited

U.S. PATENT DOCUMENTS 6,614,964 B2 * 9/2003 Kuhara ............... G02B 6/4245
385/88
7,641,397 B2   1/2010 Koreeda et al.
(Continued)

FOREIGN PATENT DOCUMENTS

GB        2359900 A  *  9/2001  .......... G02B 6/4246
JP        H09-33755 A    2/1997
(Continued)

OTHER PUBLICATIONS

International Search Report and Written Opinion of the Intenrational Searching Authority for International Patent Application No. PCT/US2017/043158 dated Oct. 30, 2017, 19 pages.
(Continued)

*Primary Examiner* — Charlie Y Peng
(74) *Attorney, Agent, or Firm* — Merchant & Gould P.C.

(57) ABSTRACT

The present disclosure relates to a ferrule-less fiber optic connector including a connector body having a front end. The ferrule-less fiber optic connector can include a plurality of optical fibers that extend through the connector body. The optical fibers can have having free end portions at the front end of the connector body that are not supported by a ferrule or by ferrules. In one example, the ferrule-less fiber optic connector can be a duplex fiber optic connector. Transceiver modules and components are also disclosed.

27 Claims, 37 Drawing Sheets

Related U.S. Application Data on Sep. 6, 2016, provisional application No. 62/365,584, filed on Jul. 22, 2016.

(56) References Cited

U.S. PATENT DOCUMENTS

| | | | |
|---|---|---|---|
| 8,870,466 B2 | 10/2014 | Lu | |
| 2003/0123809 A1 | 7/2003 | Huang | |
| 2004/0008949 A1* | 1/2004 | Liu | G02B 6/3807 385/77 |
| 2004/0071407 A1 | 4/2004 | Vergeest | |
| 2005/0265650 A1* | 12/2005 | Priyadarshi | H05K 1/148 385/14 |
| 2005/0286901 A1* | 12/2005 | Sasser | G02B 6/4206 398/135 |
| 2007/0217746 A1* | 9/2007 | Schempp | G02B 6/4292 385/58 |
| 2009/0191738 A1* | 7/2009 | Kadar-Kallen | H01R 13/5202 439/207 |
| 2009/0220227 A1* | 9/2009 | Wong | G02B 6/4292 398/41 |
| 2011/0123157 A1* | 5/2011 | Belsan | H01R 13/6315 385/75 |
| 2016/0004018 A1 | 1/2016 | Lu et al. | |
| 2016/0170152 A1 | 6/2016 | Verheyden et al. | |

FOREIGN PATENT DOCUMENTS

| | | |
|---|---|---|
| WO | 2013/100892 A1 | 7/2013 |
| WO | 2013/117598 A2 | 8/2013 |
| WO | 2016/043922 A1 | 3/2016 |
| WO | 2012/112344 A1 | 12/2017 |
| WO | 2017/223461 A1 | 12/2017 |

OTHER PUBLICATIONS

"SF Connector Optical Interface for Parallel Optical Module", NTT Technology, 4 pages, http://www.ntt.co.jp/ntt-tec/e/high-tec/ct2-c002.html, (2016).

"Gigabit Ethernet Multimode SFP LC Transceivers", Tyco Electronics Corporation Datasheet 1654845, 1-10 (2004).

"2.125 Gb/s RoHS Compliant Short-Wavelength SFP Transceiver FTLF8519P3ByL", Finisar Corporation Product Specification, 1-11 (2014).

"GBIC/SFP Transceiver Family", ZyXEL Communications Corporation, 1-2 (2004).

Photos of prior art SFP transceiver module, 7 pages (admitted prior art).

Kobayashi et al., "Injection molded plastic multifiber connector realizing physical contact with fiber elasticity," in IEEE Journal of Selected Topics in Quantum Electronics, vol. 5, No. 5, pp. 1271-1277, Sep.-Oct. 1999, doi: 10.1109/2944.806752.

Extended European Search Report for corresponding European Patent Application No. 17831905.9 dated May 15, 2020, 9 pages.

* cited by examiner

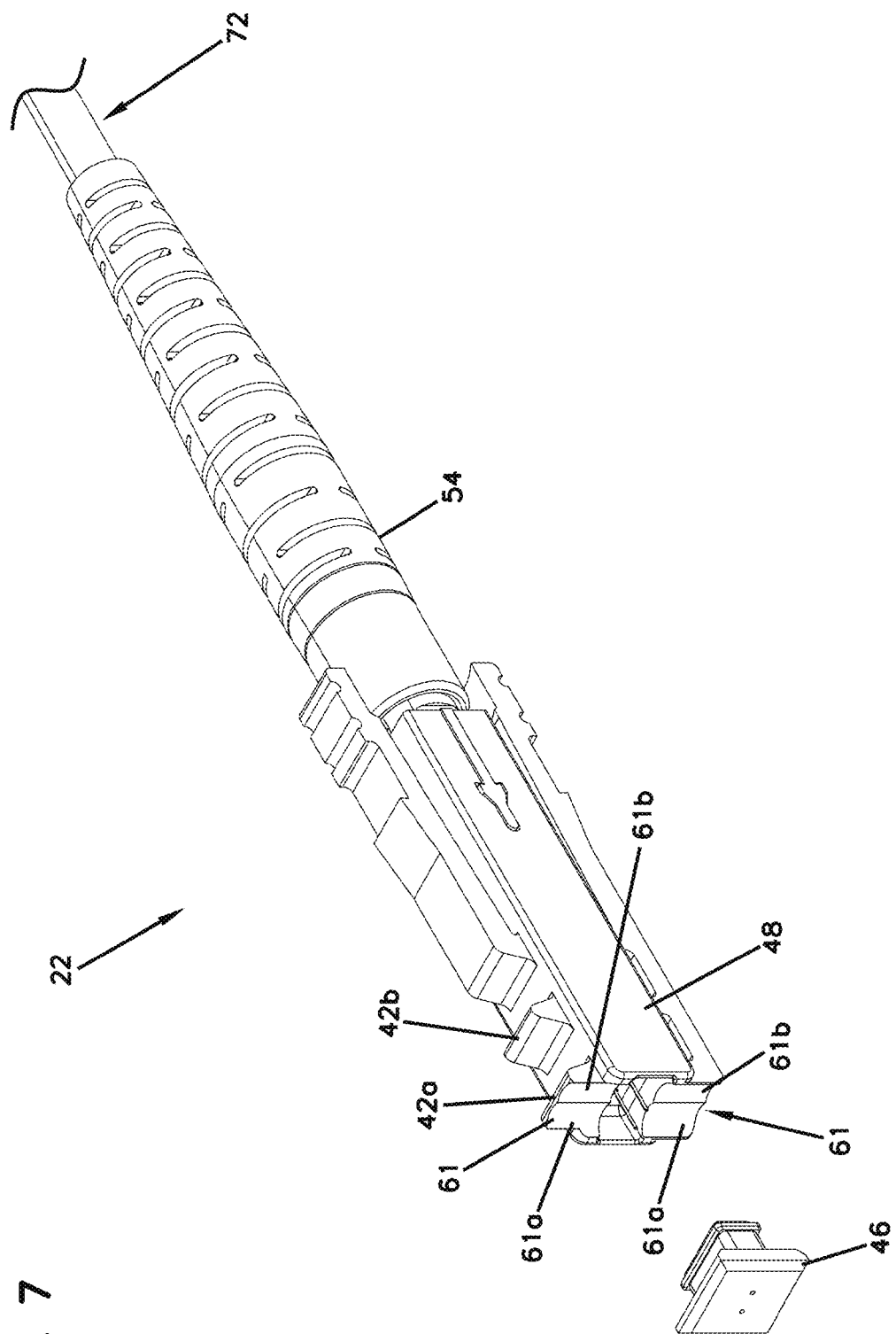

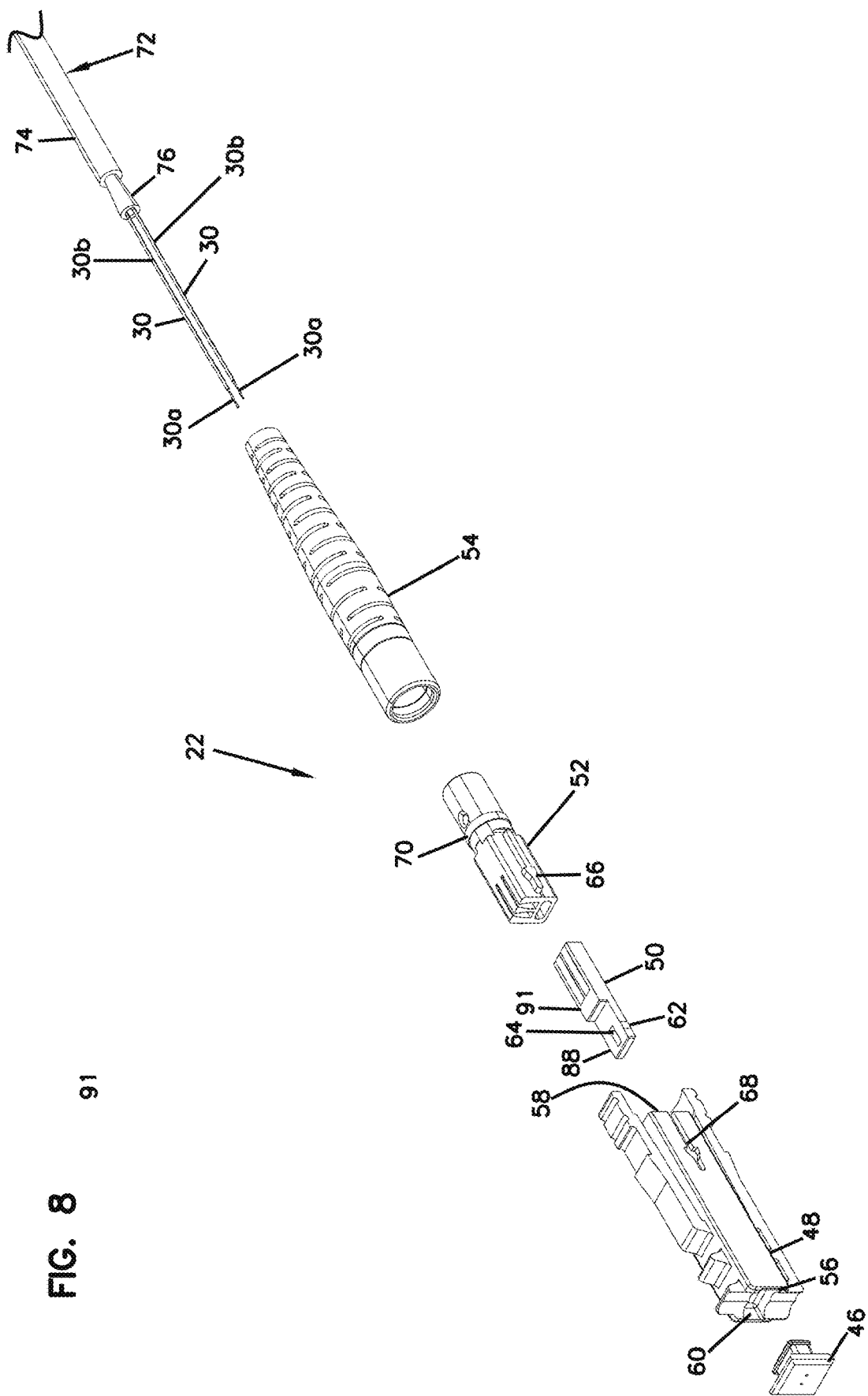

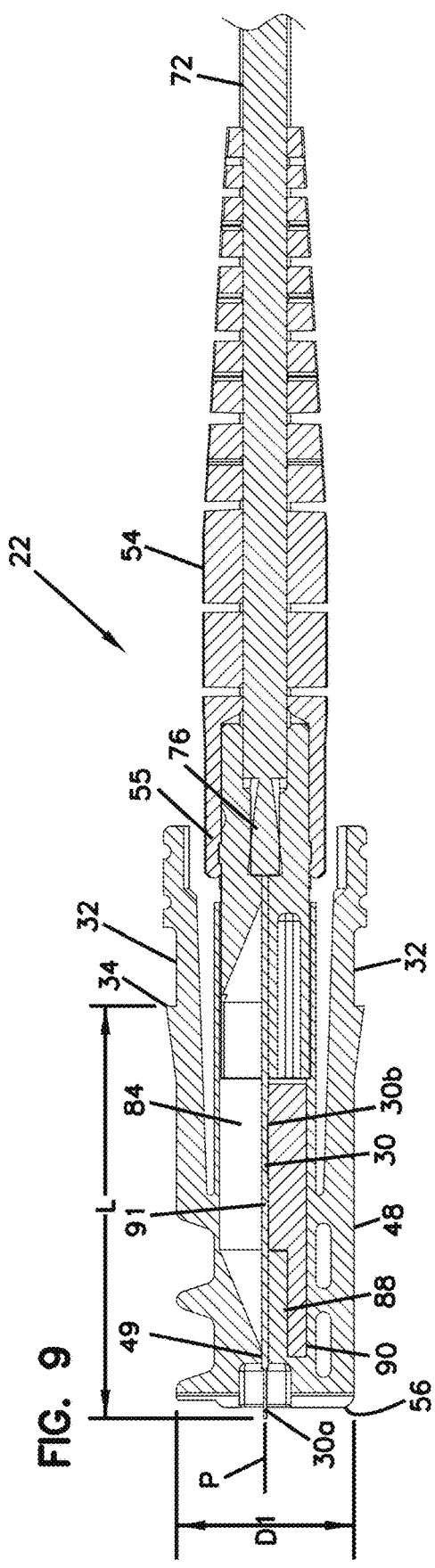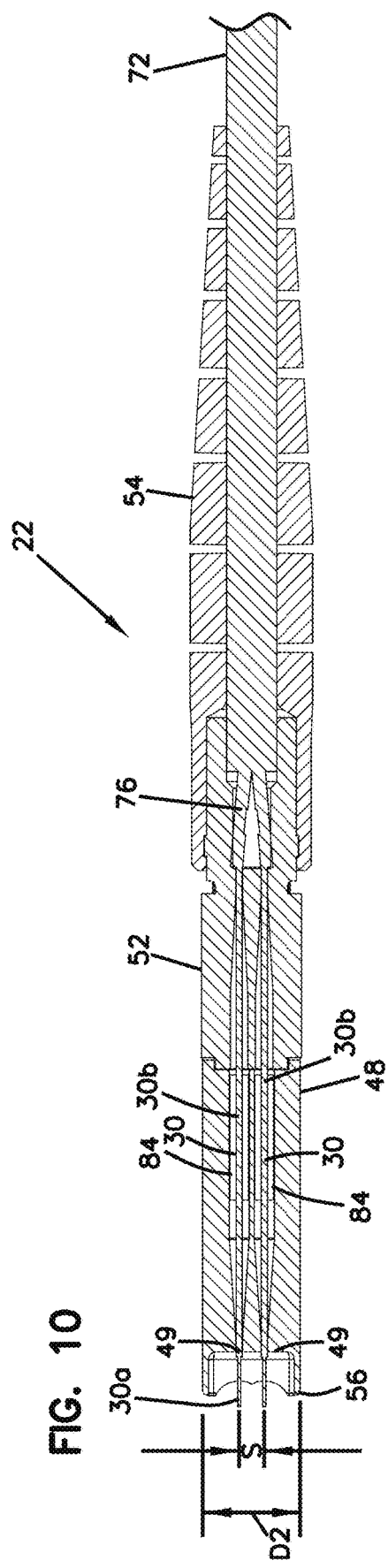

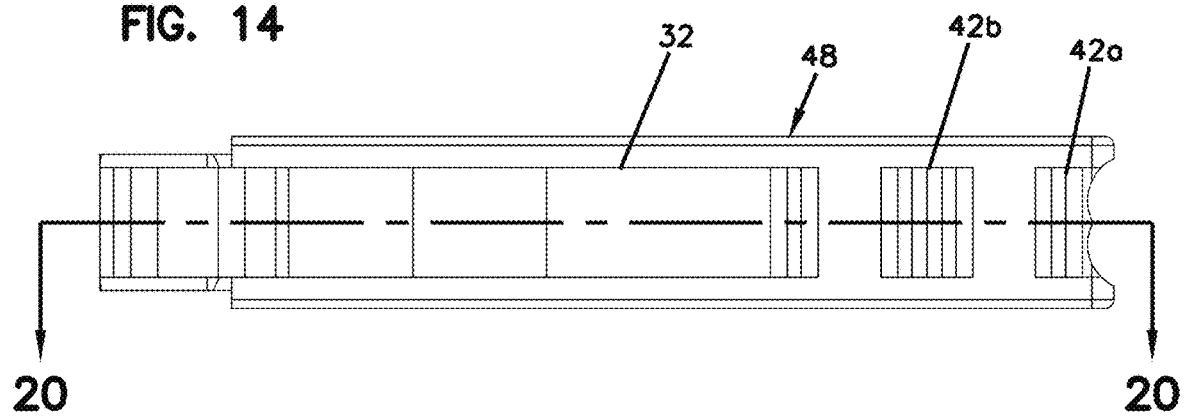
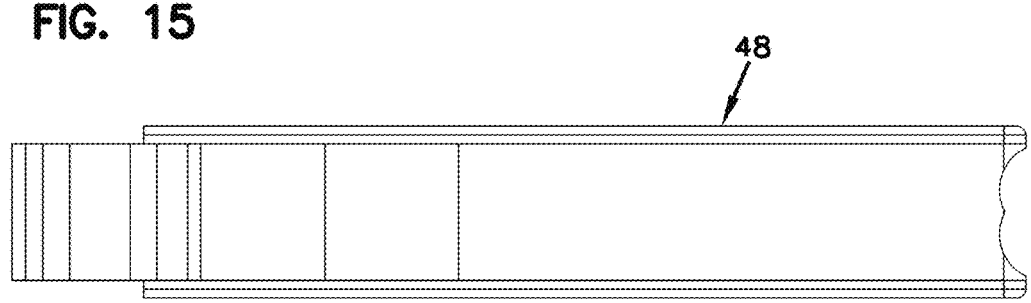
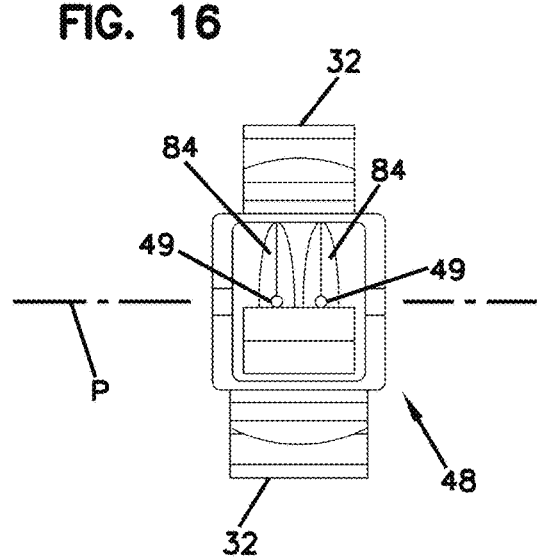
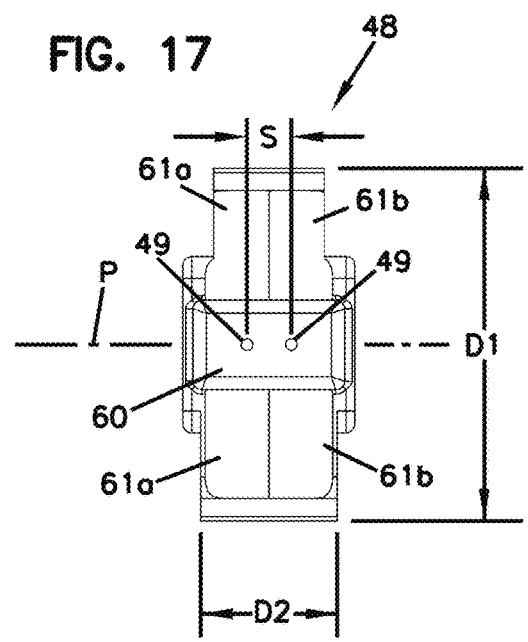

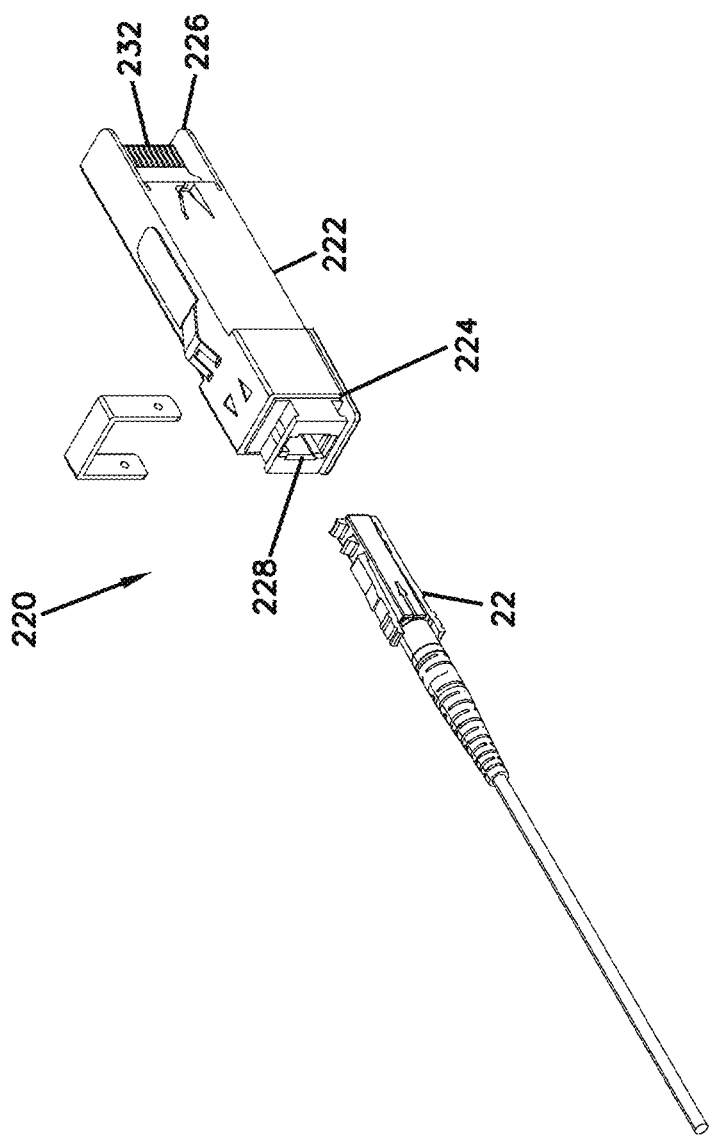

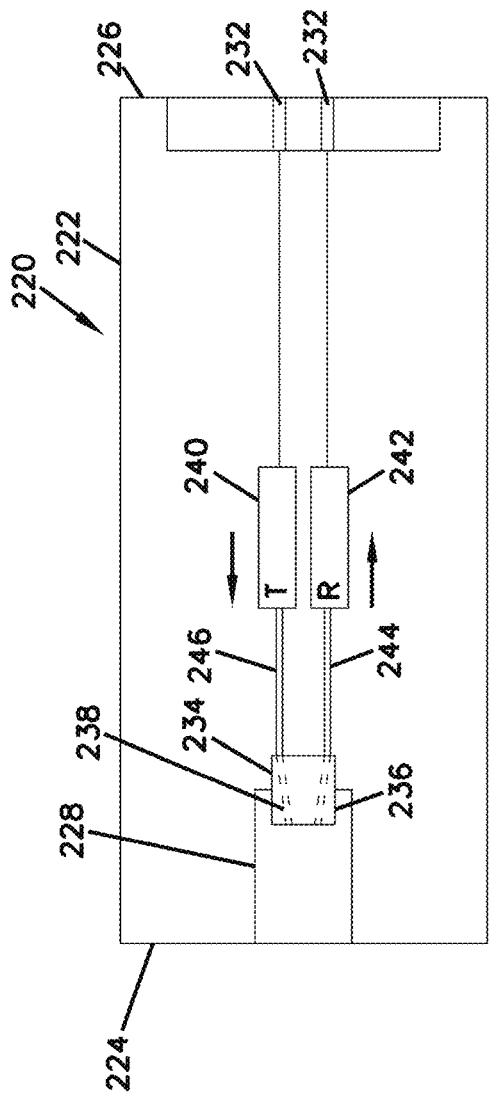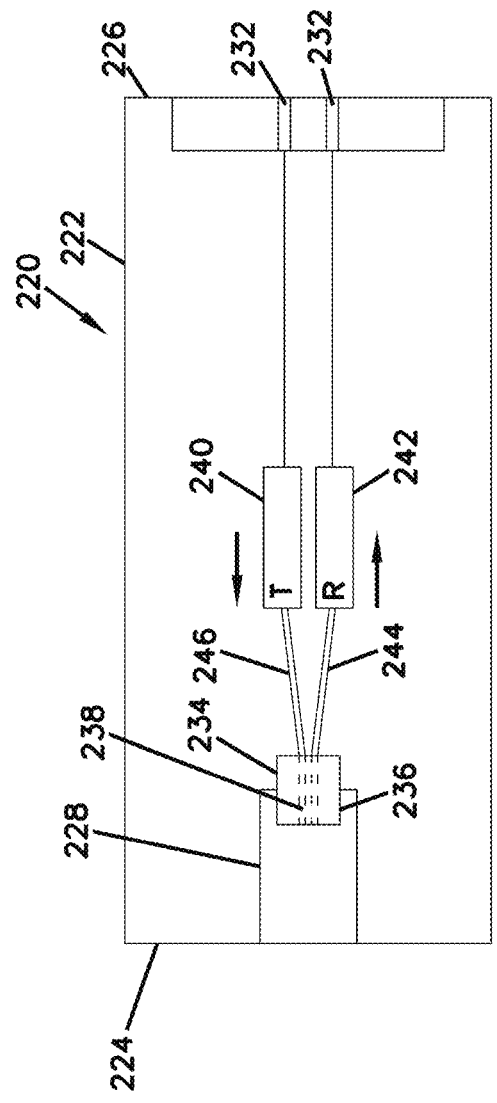

FERRULE-LESS FIBER OPTIC CONNECTOR HAVING MULTIPLE OPTICAL FIBERS

CROSS-REFERENCE TO RELATED APPLICATIONS

This application is a National Stage Application of PCT/US2017/043158, filed on Jul. 20, 2017, which claims the benefit of U.S. Patent Application Ser. No. 62/365,584, filed on Jul. 22, 2016, and claims the benefit of U.S. Patent Application Ser. No. 62/383,696, filed on Sep. 6, 2016, and claims the benefit of U.S. Patent Application Ser. No. 62/419,266, filed on Nov. 8, 2016, the disclosures of which are incorporated herein by reference in their entireties. To the extent appropriate, a claim of priority is made to each of the above disclosed applications.

TECHNICAL FIELD

The present disclosure relates generally to fiber optic connectors. More particularly, the present disclosure relates to ferrule-less fiber optic connectors.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber connectors are an important part of most fiber optic communication systems. Fiber optic connectors allow two optical fibers to be quickly optically connected without requiring a splice. Fiber optic connectors can be used to optically interconnect two lengths of optical fiber. Fiber optic connectors can also be used to interconnect lengths of optical fiber to passive and active equipment.

A typical fiber optic connector includes a ferrule assembly supported at a distal end of a connector housing. A spring is used to bias the ferrule assembly in a distal direction relative to the connector housing. The ferrule functions to support an end portion of at least one optical fiber (in the case of a multi-fiber ferrule, the ends of multiple fibers are supported). The ferrule has a distal end face at which a polished end of the optical fiber is located. When two fiber optic connectors are interconnected, the distal end faces of the ferrules abut one another and the ferrules are forced proximally relative to their respective connector housings against the bias of their respective springs. With the fiber optic connectors connected, their respective optical fibers are coaxially aligned such that the end faces of the optical fibers directly oppose one another. In this way, an optical signal can be transmitted from optical fiber to optical fiber through the aligned end faces of the optical fibers. For many fiber optic connector styles (LC, SC, MPO), alignment between two fiber optic connectors is provided through the use of an intermediate fiber optic adapter.

Another type of fiber optic connector can be referred to as a ferrule-less fiber optic connector. In a ferrule-less fiber optic connector, an end portion of an optical fiber corresponding to the ferrule-less fiber optic connector is not supported by a ferrule. Instead, the end portion of the optical fiber is a free end portion. Similar to the ferruled connectors described above, fiber optic adapters can be used to assist in optically coupling together two ferrule-less fiber optic connectors. Such fiber optic adapters can include specialized fiber alignment structures adapter to receive bare optical fibers. Example ferrule-less fiber optic connectors are disclosed by PCT Publication No. WO 2012/112344; PCT Publication No. WO 2013/117598 and U.S. Pat. No. 8,870,466.

SUMMARY

One aspect of the present disclosure relates to a ferrule-less fiber optic connector including a plurality of optical fibers having end portions that are not supported by a ferrule or by ferrules. In certain examples, the fiber optic connector includes separate buckling chambers each receiving an individual optical fiber. The buckling chambers provide a pre-defined space in which the optical fiber can buckle when an optical connection is made. In certain examples, the optical fibers of the fiber optic connector have a center-to-center spacing that is less than 1.25 millimeters, or less than or equal to 1.2 millimeters, or less than or equal to 1.1 millimeters, or less than or equal to 1.0 millimeters.

Another aspect of the present disclosure relates to a ferrule-less duplex fiber optic connector having only two optical fibers which are not supported by separate ferrules or by a single common ferrule (i.e., a multi-fiber ferrule). In certain examples, the optical fibers of the pair of optical fibers have a center-to-center spacing less than 1.25 millimeters, or less than or equal to 1.2 millimeters, or less than or equal to 1.1 millimeters, or less than or equal to 1.0 millimeters.

Another aspect of the present disclosure relates to a ferrule-less fiber optic connector having at least one optical fiber that is not supported by a ferrule. The at least one optical fiber can extend through a connector housing having flexible latches positioned at opposite sides of the connector housing. The flexible latches can be configured to symmetrically secure the fiber optic connector within a port of a fiber optic adapter. In certain examples, the fiber optic connector can be a duplex ferrule-less fiber optic connector. In certain examples, the fiber optic connector can include more than two optical fibers having end portions that are not supported by a ferrule or by separate ferrules.

Still another aspect of the present disclosure relates to a ferrule-less fiber optic connector having at least one optical fiber that is not supported by a ferrule. The fiber optic connector can be configured such that the optical fiber can be processed (e.g., polished, shaped, electric arc treated, laser treated, plasma discharge treated, or otherwise processed) after the optical fiber has been secured within a housing (e.g., a connector body) of the fiber optic connector. In certain examples, the housing of the fiber optic connector can have an open end face that allows the optical fiber to be readily accessed. In certain examples, the fiber optic connector can include two or more optical fibers that are not supported by a ferrule or ferrules. In certain examples, processing the one or more optical fibers after the one or more optical fibers have been secured in the fiber optic connector allows a spacing between an end of the one or more optical fibers and a latch of the fiber optic connector to be precisely set.

Another aspect of the present disclosure relates to a fiber optic connector having a flexible latch and also including a boot that forms a latch stop for preventing the latch from being flexed beyond its elastic limit. In certain examples, the latch is used to secure the fiber optic connector in a port of a fiber optic adapter. In certain examples, the fiber optic connector includes symmetrical latches positioned on opposite sides of a plug body of the fiber optic connector and the boot provides stop structures for stopping each of the latches at a location where the latches are prevented from deforming beyond their elastic limits.

Another aspect of the present disclosure relates to a ferrule-less fiber optic connector having two or more optical fibers having end portions that are not supported by a ferrule or by separate ferrules. The fiber optic connector includes a plug body (e.g., a connector housing) through which the optical fibers extend. The fiber optic connector also includes a fiber anchor component in which the optical fibers are anchored via adhesive. In certain examples, the fiber anchor component is secured within the plug body by a snap-fit connection or by a press-fit connection. In certain examples, the fiber anchor component includes separate parallel passages for separately receiving each of the optical fibers. In certain examples, optical fibers can include forward portions that extend forwardly from the anchoring component through the plug body. In certain examples, forward portions can have end-most portions that include bare glass (e.g., an uncoated section of glass including a core covered by a cladding layer). In certain examples, portions of the optical fibers can be coated by a protective layer such as a polymeric material such as acrylate. In certain examples, the plug body can include separate parallel buckling chambers for separately receiving each of the forward portions of the optical fibers. In certain examples, portions of the optical fibers within the fiber buckling chambers can include protective coating layers. In certain examples, the plug body can include an end face at which the uncoated end-most portions of the optical fibers can be accessed.

A further aspect of the present disclosure relates to a ferrule-less duplex fiber optic connector having an end. The fiber optic connector also includes two optical fibers having ends that are accessible at the end of the fiber optic connector. The end of the fiber optic connector can define a major dimension and a minor dimension. The end portions of the optical fibers can be aligned along a plane that is parallel to the minor dimension of the plug body.

Another aspect of the present disclosure relates to multi-fiber ferrule-less connector having a plug body defining a plurality of separate buckling chambers each configured for receiving a single optical fiber. The fiber optic connector can also include an insert piece that mounts within the plug body and that defines bump-structures that align with the buckling chambers for providing the optical fibers extending through the buckling chambers with a pre-disposed bend. In certain examples, the fiber optic connector also includes an anchoring component for anchoring the optical fibers axially relative to the plug body. In certain examples, the anchoring component can snap-fit within the plug body. In certain examples, the anchoring component can function to retain the insert piece within the plug body.

Another aspect of the present disclosure relates to a dust cap for a fiber optic connector. In certain examples, the dust cap can be used with a ferrule-less fiber optic connector. In certain examples, the dust cap can contain a non-gaseous fluid in which an optical fiber (e.g., an optical fiber not supported by a ferrule) can imbed when the dust cap is installed on the corresponding fiber optic connector. In certain examples, the non-gaseous fluid can block the vent opening. In certain examples, the vent opening can be configured to allow air to exit the dust cap when the non-gaseous fluid is injected or otherwise applied within the dust cap. In certain examples, the non-gaseous fluid can include a gel or gel-like composition. In certain examples, the non-gaseous fluid can have gel-like mechanical characteristics or fluidity. In certain examples, the non-gaseous fluid can deform or flow in order to receive the optical fiber therein. In certain examples, the non-gaseous fluid can protect the optical fiber and provide cleaning of the optical fiber. In certain examples, the non-gaseous fluid can include an index-matching gel. In certain examples, the dust cap is configured for use with a multi-fiber ferrule-less connector, and the dust cap defines separate vent ports corresponding to each of the optical fibers of the multi-fiber connector.

Another aspect of the present disclosure relates to a ferrule-less fiber optic connector. The fiber optic connector includes a connector body having a front end and a defined form factor. The fiber optic connector further includes a plurality of bare optical fibers that extend through the connector body. The plurality of bare optical fibers each have a diameter and a free end portion at the front end of the connector body that is not supported by a ferrule or by ferrules. The center-to-center spacing between the plurality of bare optical fibers is adjustable within the defined form factor from a minimum center-to-center spacing between the plurality of bare optical fibers and a maximum center-to-center spacing that is greater than or equal to two times the minimum center-to-center spacing.

Another aspect of the present disclosure relates to an optical transceiver module that includes a fiber alignment structure, a transmit component and a receive component. The fiber alignment structure has a first end and a second end. The transmit component is coupled to the first end of the fiber alignment structure with an optical fiber comprising one of a first pair of optical fibers. The receive component is coupled to the first end of the fiber alignment structure with an optical fiber comprising the other of the first pair of optical fibers. The first pair of optical fibers have a first center-to-center spacing at the transmit and receive components. The second end of the fiber alignment structure is configured to receive a second pair of optical fibers. The second pair of optical fibers have a second center-to-center spacing that is different from the first center-to-center spacing.

Another aspect of the present disclosure relates to a transceiver component including a dielectric housing; a ferrule-less fiber alignment structure positioned within the dielectric housing, the ferrule-less fiber alignment structure defining a fiber axis; and an optical component positioned within the dielectric housing, the optical component being aligned with the fiber axis, the optical component including an optical receiver or an optical transmitter.

A further aspect of the present disclosure relates to a transceiver module including a printed circuit board having a first end and a second end; an electrical connector positioned at the second end of the printer circuit board; a metal housing enclosing the printed circuit board, the metal housing defining a fiber optic connector port adjacent the first end of the printed circuit board; and a subassembly coupled with the printed circuit board, the subassembly including a dielectric housing; a ferrule-less fiber alignment structure positioned within the dielectric housing, the ferrule-less fiber alignment structure defining a fiber axis aligned with the fiber optic connector port; and an optical component positioned within the dielectric housing, the optical component being aligned with the fiber axis, the optical component including an optical receiver or an optical transmitter.

Still another aspect of the present disclosure relates to a transceiver module including a printed circuit board having a first end and a second end; an electrical connector positioned at the second end of the printer circuit board; a first ferrule-less or ferrule-based fiber alignment structure positioned at the first end of the printed circuit board; a subassembly coupled with the printed circuit board at a location offset from the first end of the printed circuit board, the subassembly including a dielectric housing; a second ferrule-less or ferrule-based fiber alignment structure positioned within the dielectric housing, and an optical component positioned within the dielectric housing, the optical component including an optical receiver or an optical transmitter; and an optical fiber extending from the first ferruleless or ferrule-based fiber alignment structure to the second ferrule-less or ferrule-based fiber alignment structure.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

FIG. 7 shows the duplex fiber optic connector of FIG. 6 with a dust cap of the duplex fiber optic connector exploded away from a plug body of the duplex fiber optic connector;

FIG. 8 is an exploded view of the duplex fiber optic connector of FIG. 6;

FIG. 9 is a cross-sectional view taken along a vertical plane that extends lengthwise through the duplex fiber optic connector of FIG. 6 and that cuts longitudinally through one of the optical fibers of the duplex fiber optic connector of FIG. 6;

FIG. 10 is a cross-sectional view taken along a horizontal plane that extends lengthwise through the duplex fiber optic connector of FIG. 6 and that cuts longitudinally through both of the optical fibers of the duplex fiber optic connector of FIG. 6;

FIG. 14 is a top view of the connector body of FIG. 11;

FIG. 15 is a bottom view of the connector body of FIG. 11;

FIG. 16 is a rear view of the connector body of FIG. 11;

FIG. 17 is a front view of the connector body of FIG. 11;

FIG. 45 is a first perspective view of an optical transceiver module adapted to interface with the duplex fiber optic connector of FIG. 6;

FIG. 50 is a schematic depiction of a modified version of the optical transceiver module of FIG. 45.

FIG. 51 is a schematic depiction of a modified version of the optical transceiver module of FIG. 45;

DETAILED DESCRIPTION

Figure 1:
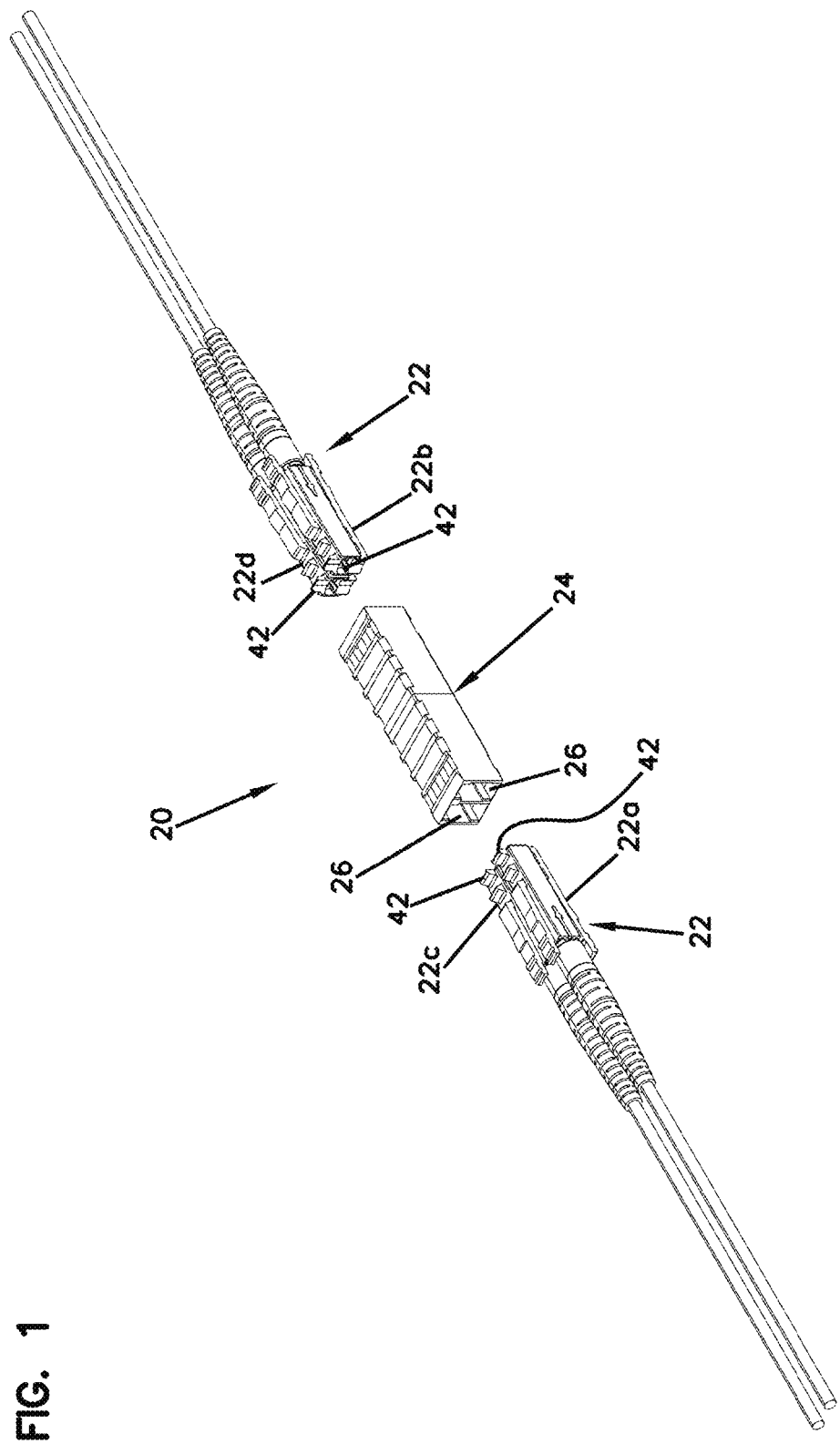
FIG. 1 illustrates a ferrule-less fiber optic connection system in accordance with the principles of the present disclosure, the system shows four duplex fiber optic connectors and an intermediate fiber optic adapter for mating the duplex fiber optic connectors together.

Various examples will be described in detail with reference to the drawings, wherein like reference numerals represent like parts and assemblies throughout the several views. Any examples set forth in this disclosure are not intended to be limiting and merely set forth some of the many possible ways for implementing the broad inventive aspects disclosed herein.

FIG. 1 shows a fiber optic connection system 20 in accordance with the principles of the present disclosure. The fiber optic connection system 20 includes a plurality of duplex fiber optic connectors 22 and a fiber optic adapter 24. The fiber optic adapter 24 includes ports 26 for receiving the duplex fiber optic connectors 22. In the depicted example of FIG. 1, duplex fiber optic connectors 22a and 22b are adapted to be optically and mechanically coupled together through the fiber optic adapter 24, and duplex fiber optic connectors 22c and 22d are adapted to be optically and mechanically coupled together by the fiber optic adapter 24. It will be appreciated that the duplex fiber optic connectors 22a, 22b, 22c, and 22d can all have identical configurations and therefore the general reference number 22 is applicable to each of the duplex fiber optic connectors 22a, 22b, 22c, and 22d.

Figure 2:
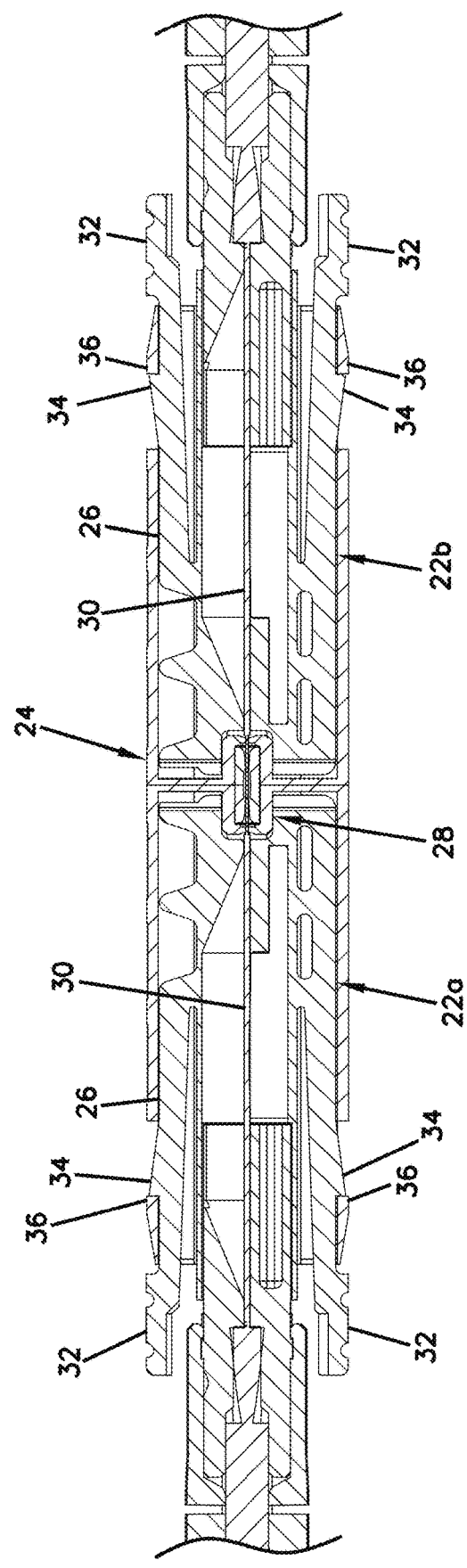
FIG. 2 is a cross-sectional view taken along a vertical cross-section plane through the fiber optic connection system of FIG. 1, in this Figure the fiber optic connectors have been inserted within the fiber optic adapter and the cross-sectional plane has been taken through one set of coaxially-aligned optical fibers corresponding to two of the mated duplex fiber optic connectors.

FIG. 2 is a cross-sectional view that shows the duplex fiber optic connectors 22a and 22b loaded within corresponding ports 26 of the fiber optic adapter 24. The fiber optic adapter 24 includes a fiber alignment structure 28 that provides an alignment interface for aligning the optical fibers of the duplex fiber optic connectors 22a, 22b. As shown at FIG. 2, optical fibers 30 of the duplex fiber optic connectors 22a, 22b are shown received within the fiber alignment structure 28 and co-axially aligned with one another. The duplex fiber optic connectors 22a and 22b include flexible latches 32 having retention catches 34 that snap within corresponding openings 36 defined by the fiber optic adapter 24 to mechanically retain the duplex fiber optic connectors 22a, 22b within their corresponding ports 26. It will be appreciated that the fiber alignment structure 28 is adapted to receive optical fibers that are not supported by or secured within corresponding ferrules. It will also be appreciated that each of fiber connector 22 and fiber optic adapter 24 are comprised entirely of non-metallic materials, e.g. plastics, polymers, etc. The absence of any metal within the fiber optic connector 22 and fiber optic adapter 24 creates an interference-free signal environment.

As used herein, a "ferrule" is a relatively hard structure adapted to receive and support an optical fiber near the end or at the end of the optical fiber. A ferrule is typically adapted to assist in providing alignment of an optical fiber with a corresponding optical fiber of a mated fiber optic connector. In the case of single-fiber ferrules, such ferrules are often cylindrical and often have a construction made of ceramic or of relatively hard plastic. Examples of these types of ferrules can include SC ferrules and LC ferrules. Ferrules can also include multi-fiber ferrules that receive and support a plurality of optical fibers. An example multi-fiber ferrule can include an MPO ferrule.

As used herein, a bare fiber is a section of optical fiber that does not include any coating. Instead, the bare fiber includes a core surrounded by a cladding layer. The optical fiber is "bare" because the cladding layer is exposed and not covered by a supplemental coating layer such as acrylate.

Figure 3:
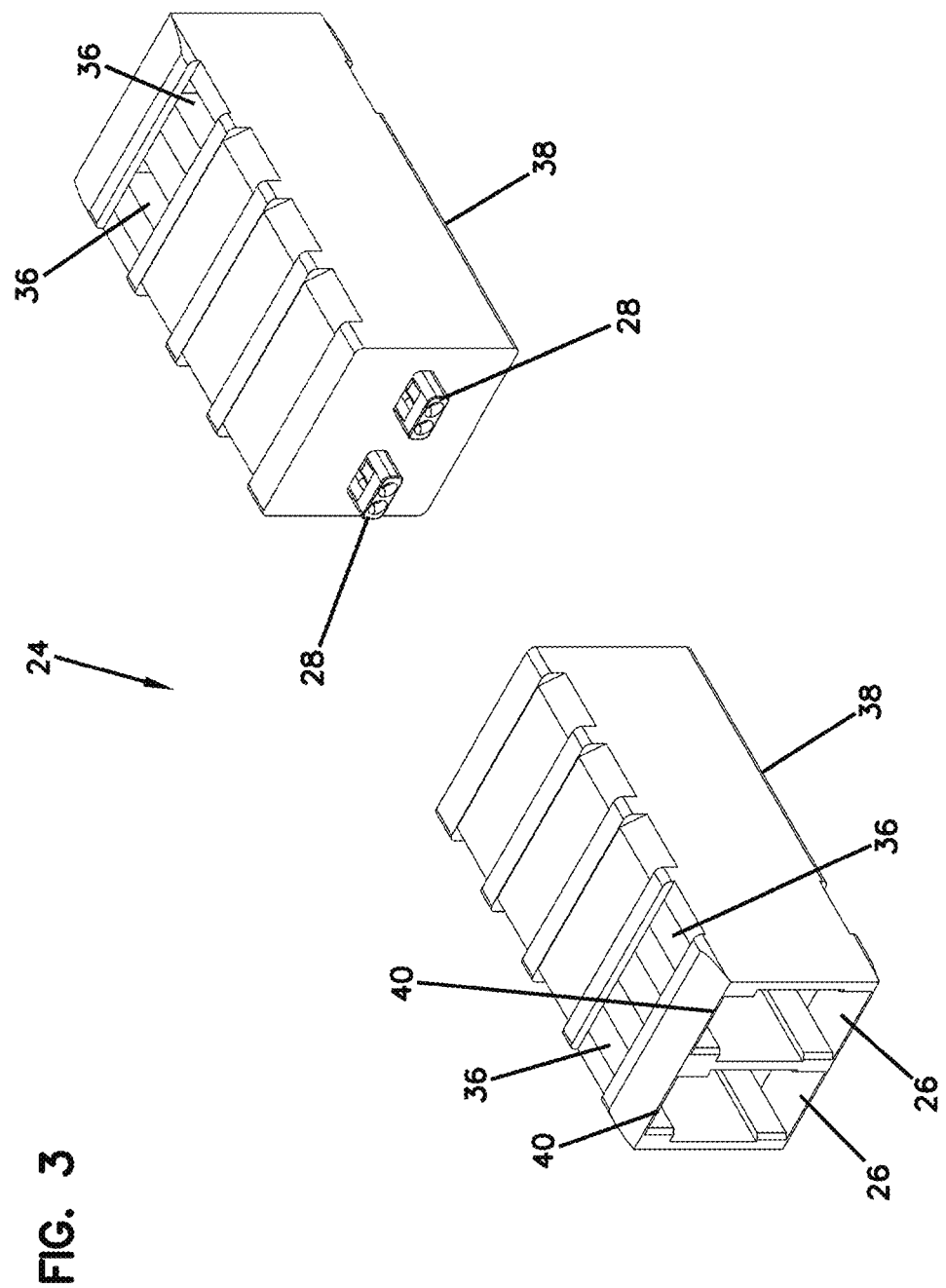
FIG. 3 is an exploded view of the fiber optic adapter of the fiber optic connection system of FIG. 1.
Figure 6:
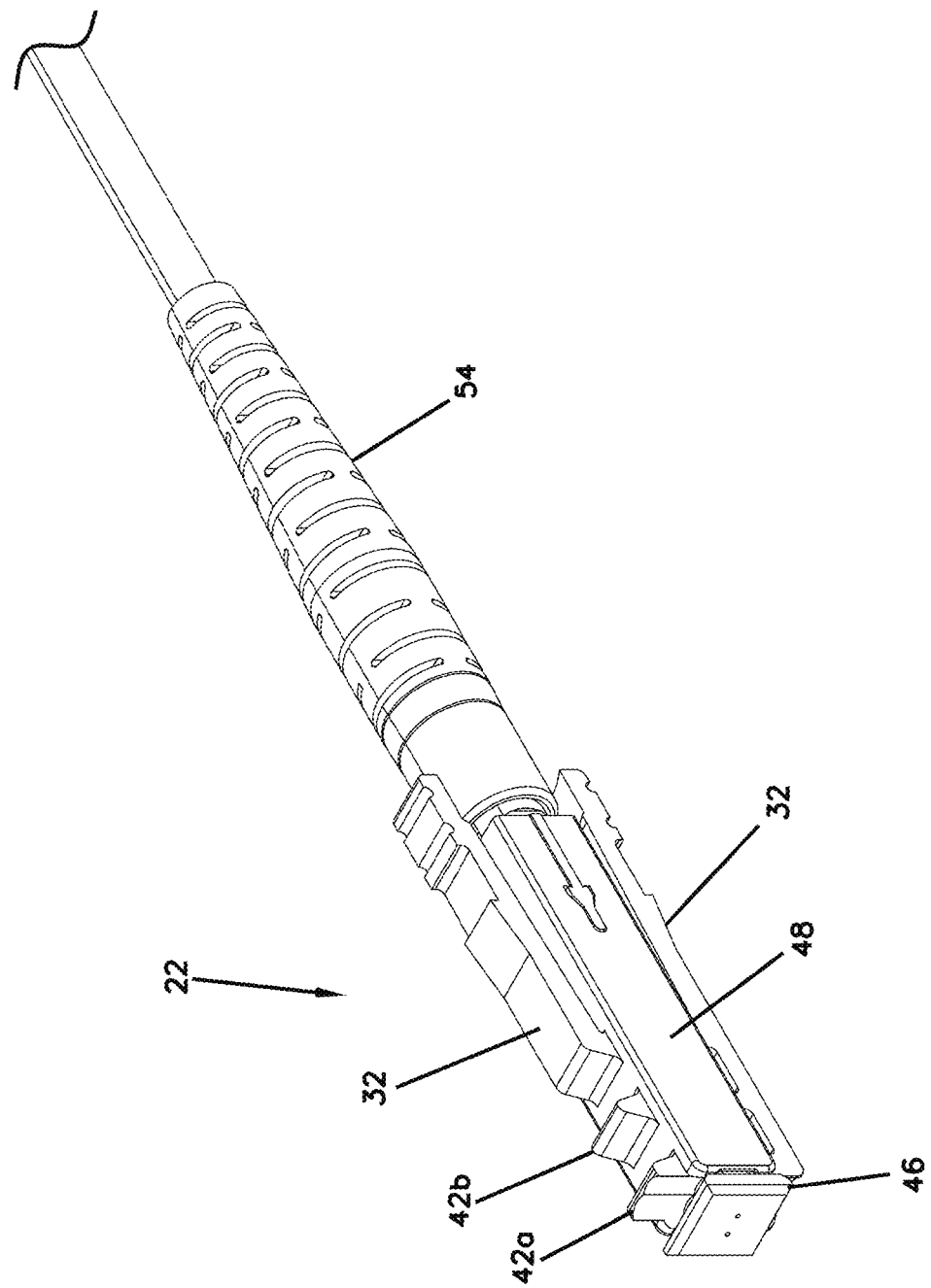
FIG. 6 is a perspective view of one of the duplex fiber optic connectors of the fiber optic connection system of FIG. 1.
Figure 11:
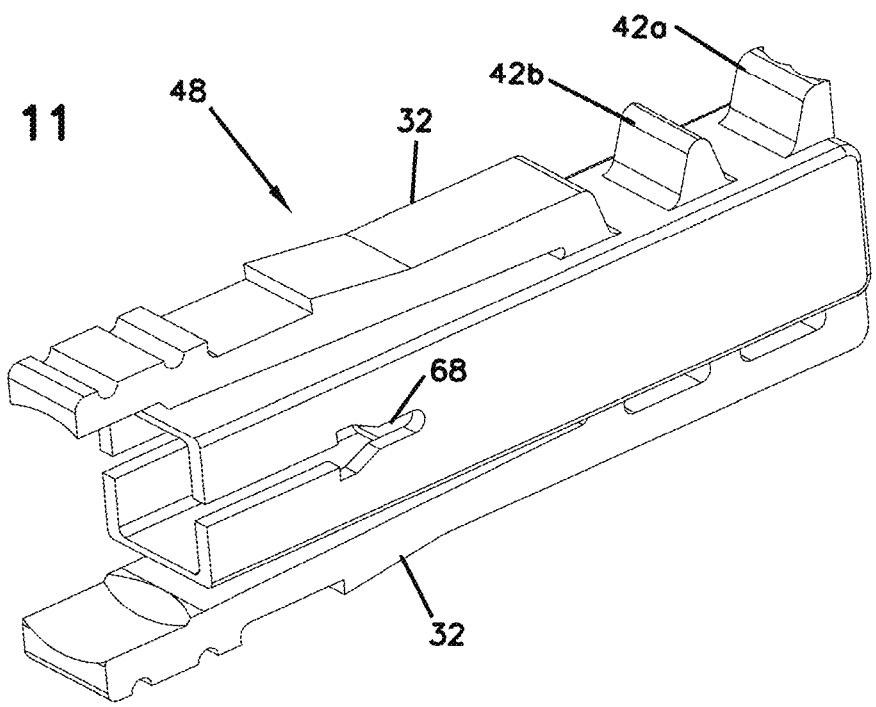
FIG. 11 is a rear, side, top perspective view of a connector body of the duplex fiber optic connector of FIG. 6.
Figure 12:
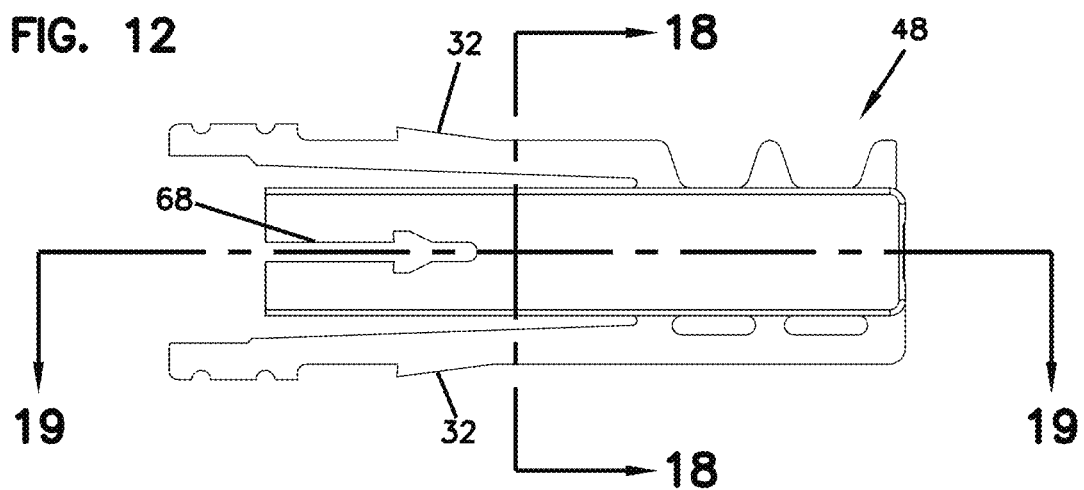
FIG. 12 is a first side view of the connector body of FIG. 11.
Figure 13:
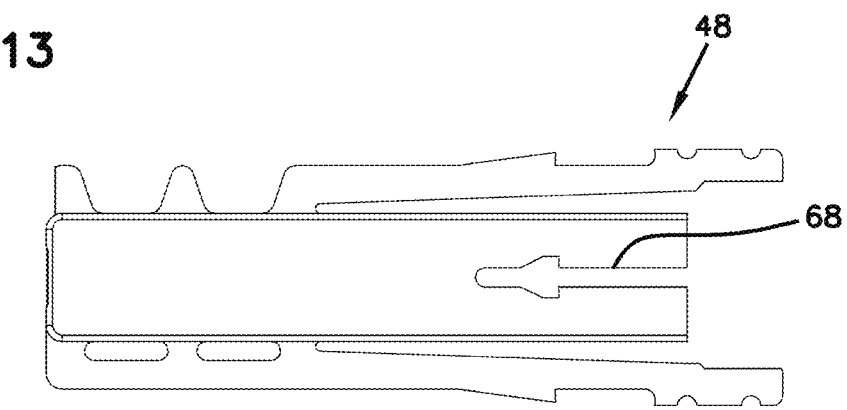
FIG. 13 is a second side view of the connector body of FIG. 11.
Figure 18:
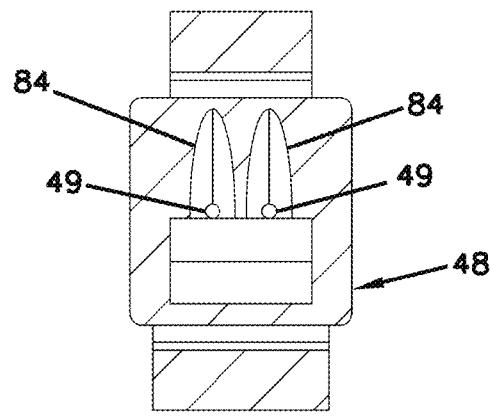
FIG. 18 is a cross-sectional view taken along section line 18-18 of FIG. 12.
Figure 19:
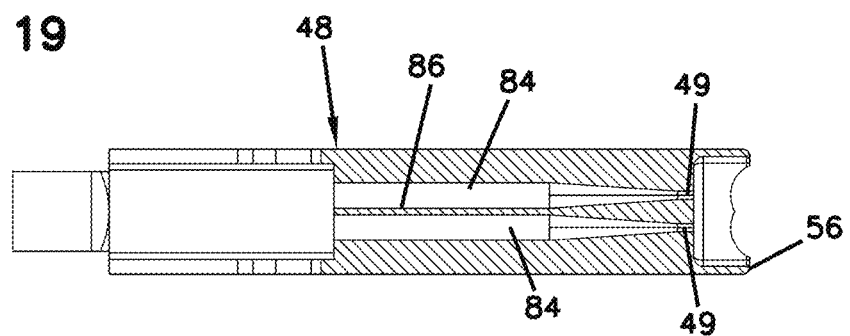
FIG. 19 is a cross-sectional view taken along section line 19-19 of FIG. 12.
Figure 20:
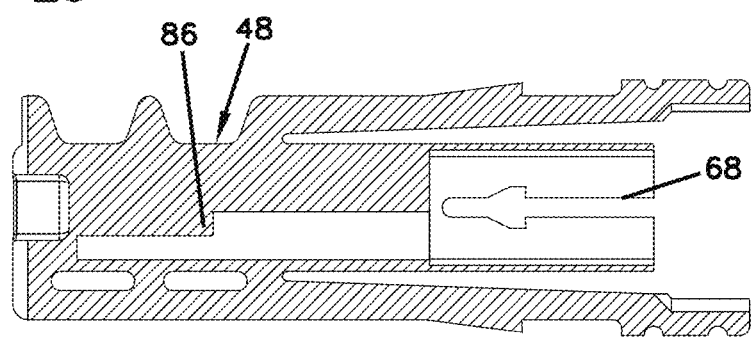
FIG. 20 is a cross-sectional view taken along section line 20-20 of FIG. 14.
Figure 21:
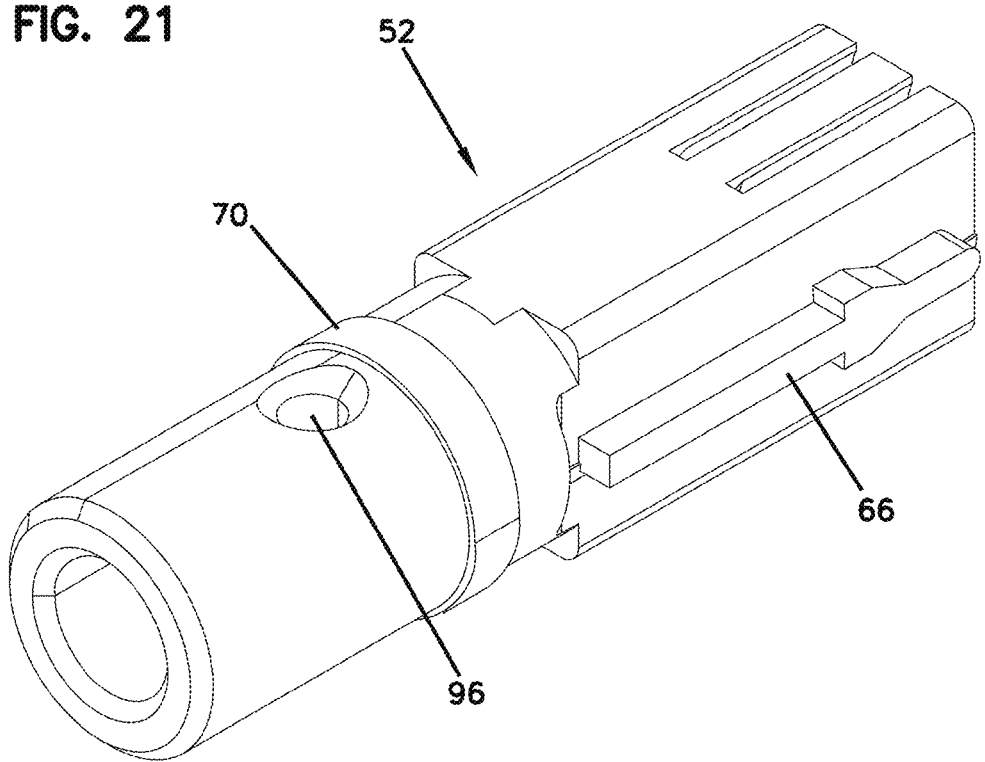
FIG. 21 is a rear, side, top perspective view of a fiber anchoring component of the duplex fiber optic connector of FIG. 6.
Figure 22:
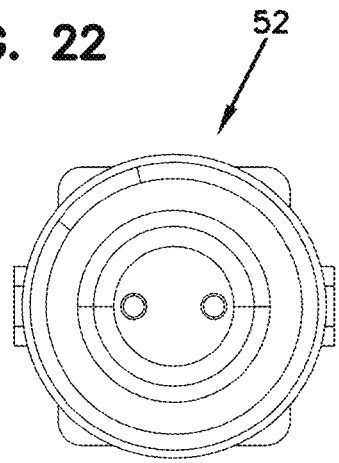
FIG. 22 is a rear view of the fiber anchoring component of FIG. 21.
Figure 23:
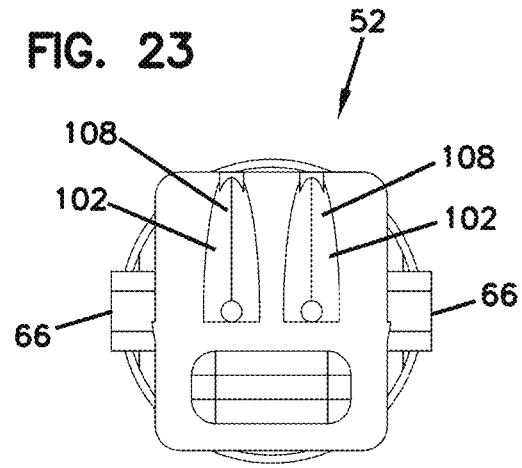
FIG. 23 is a front view of the fiber anchoring component of FIG. 21.
Figure 24:
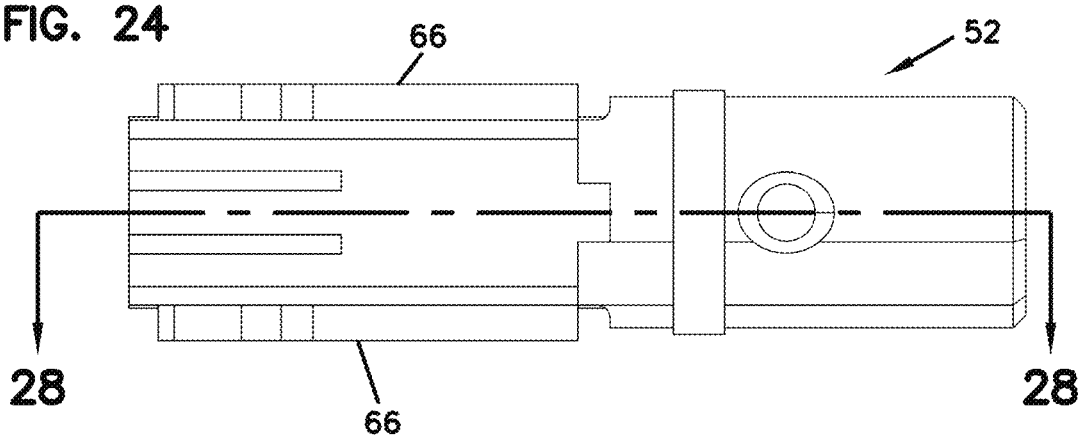
FIG. 24 is a top view of the fiber anchoring component of FIG. 21.
Figure 25:
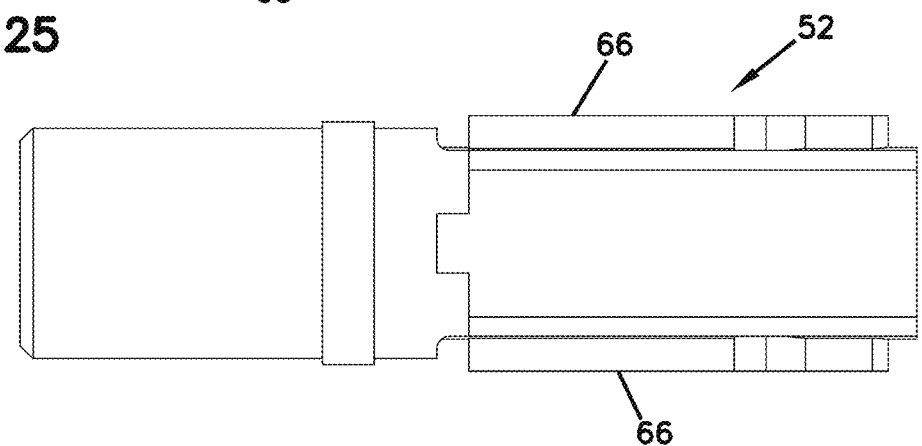
FIG. 25 is a bottom view of the fiber anchoring component of FIG. 21.
Figure 26:
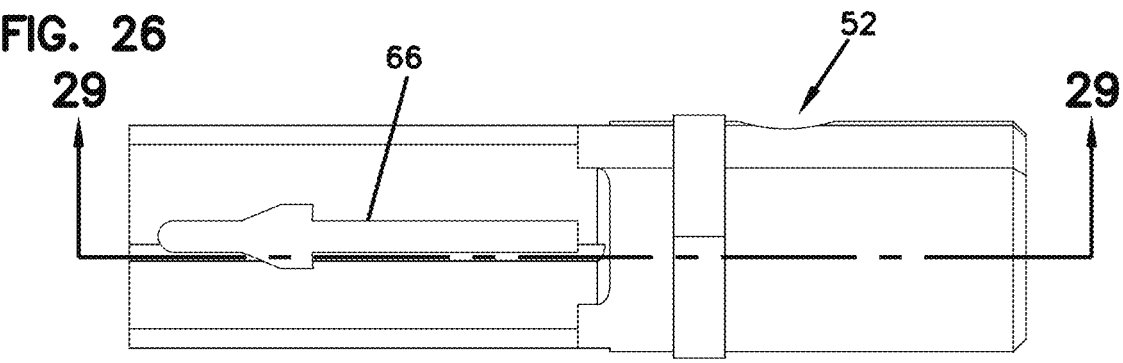
FIG. 26 is a first side view of the fiber anchoring component of FIG. 21.
Figure 27:
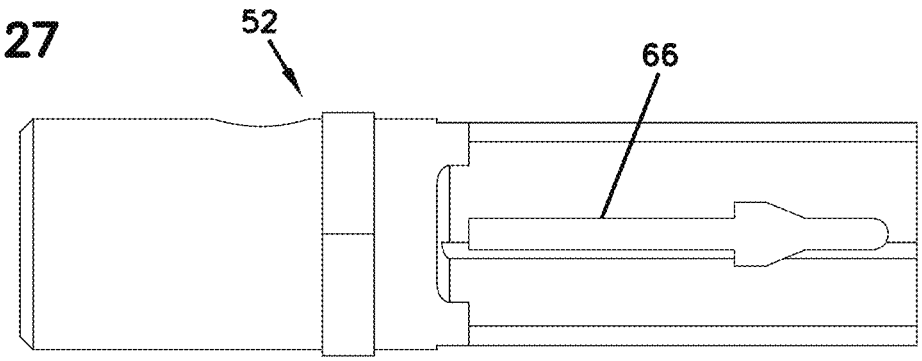
FIG. 27 is a second side view of the fiber anchoring component of FIG. 21.
Figure 28:
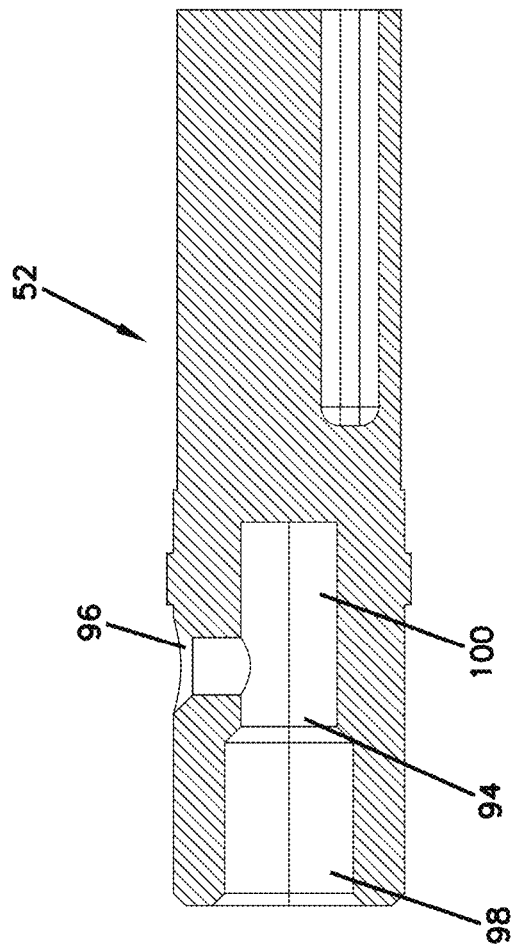
FIG. 28 is a cross-sectional view taken along section line 28-28 of FIG. 24.
Figure 29:
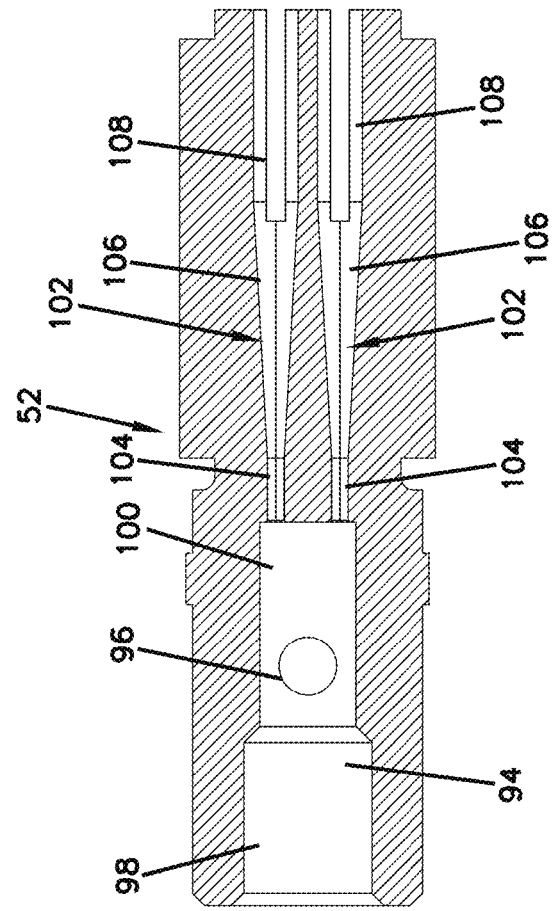
FIG. 29 is a cross-sectional view taken along section line 29-29 of FIG. 26.
Figure 30:
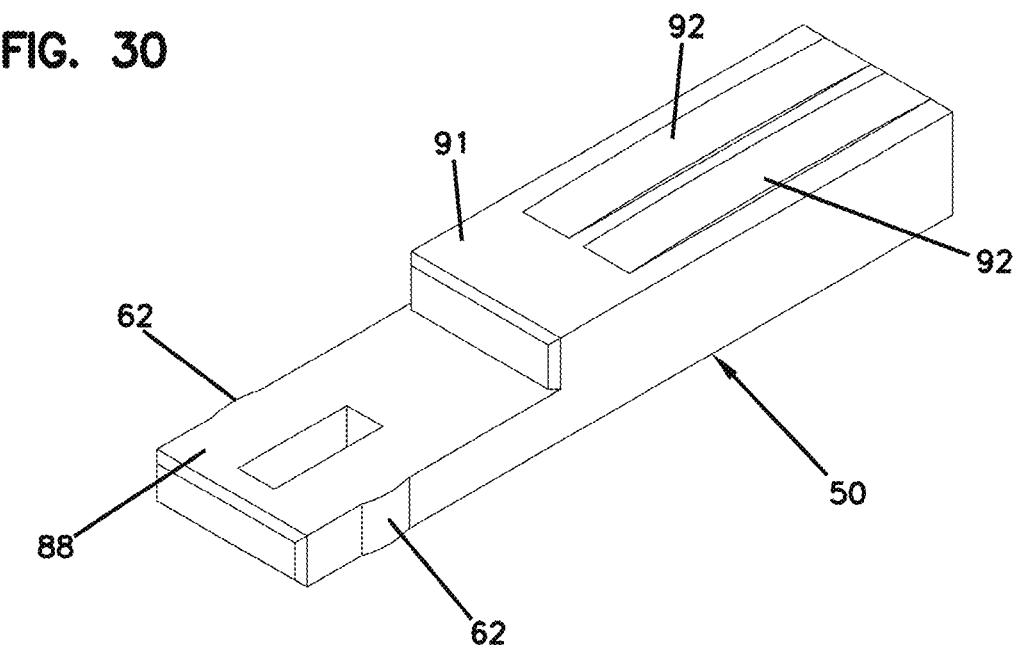
FIG. 30 is a front, top, side view of an insert that fits within the connector body of the duplex fiber optic connector of FIG. 6.
Figure 31:
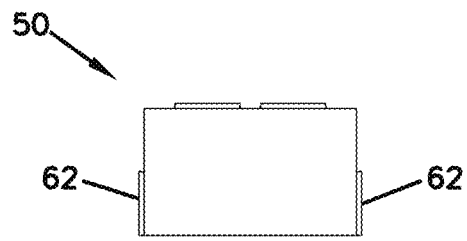
FIG. 31 is a rear view of the insert of FIG. 30.
Figure 32:
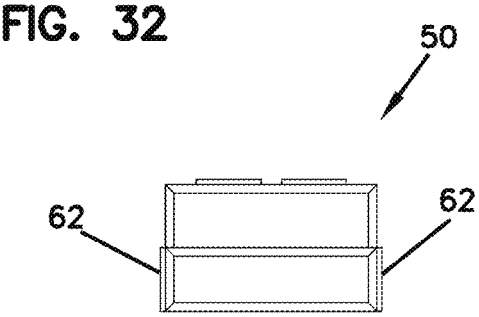
FIG. 32 is a front view of the insert of FIG. 30.
Figure 33:
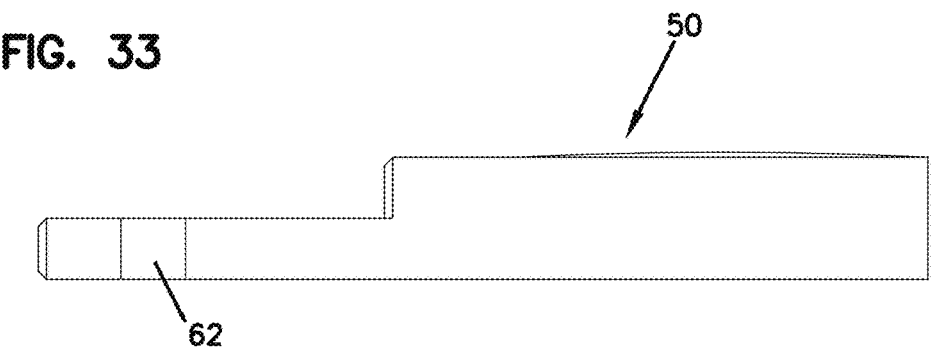
FIG. 33 is a first side view of the insert of FIG. 30.
Figure 34:
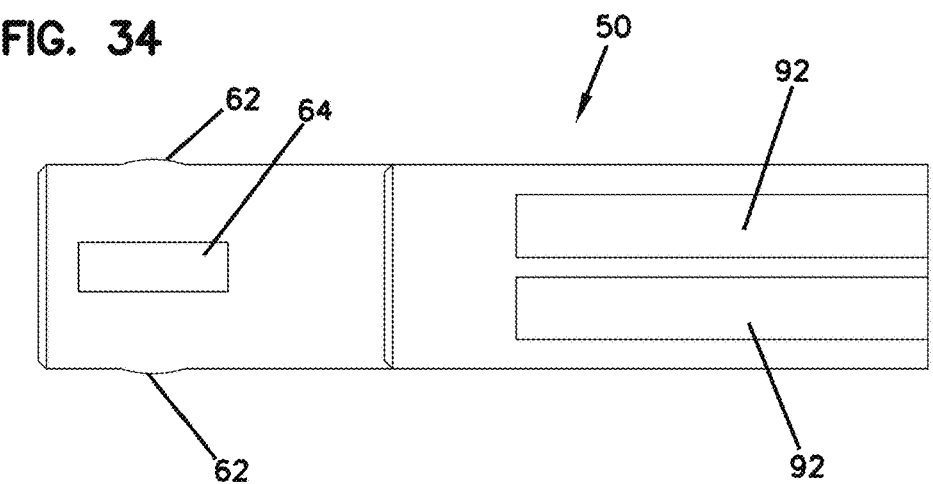
FIG. 34 is a top view of the insert of FIG. 30.
Figure 35:
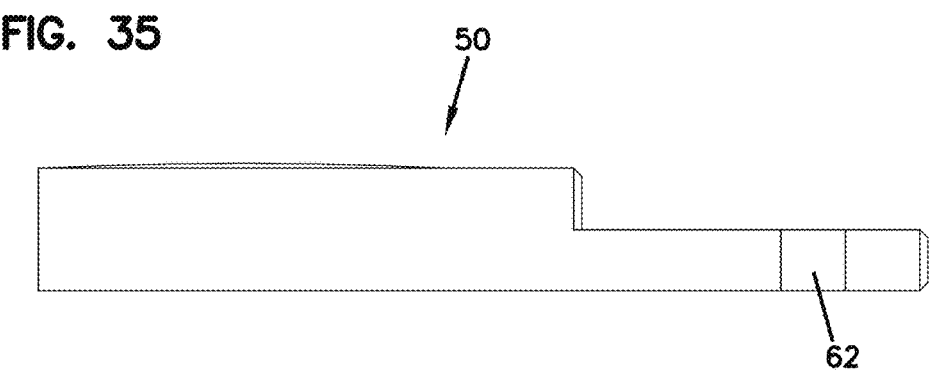
FIG. 35 is a second side view of the insert of FIG. 30.
Figure 36:
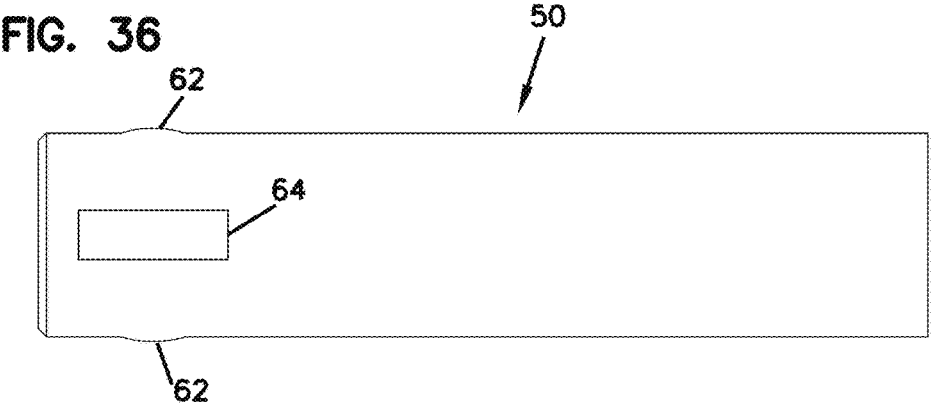
FIG. 36 is a bottom view of the insert of FIG. 30.
Figure 37:
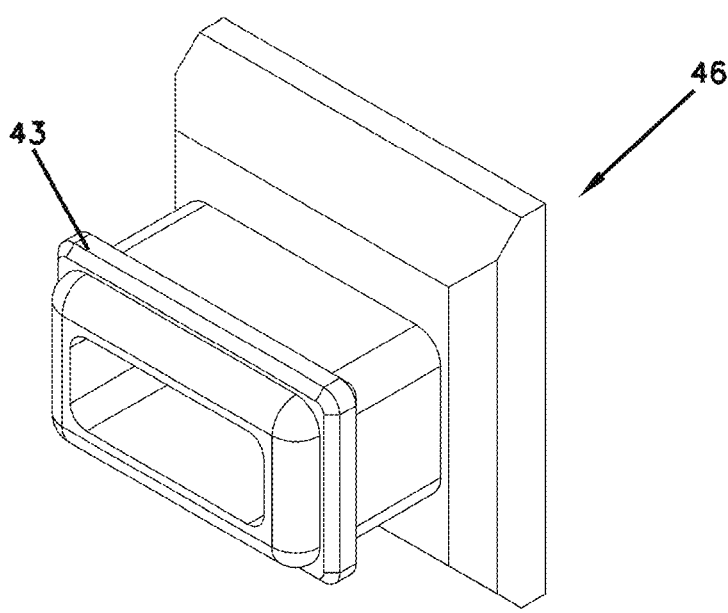
FIG. 37 is a rear, side, top perspective view of a dust cap of the duplex fiber optic connector of FIG. 6.
Figure 38:
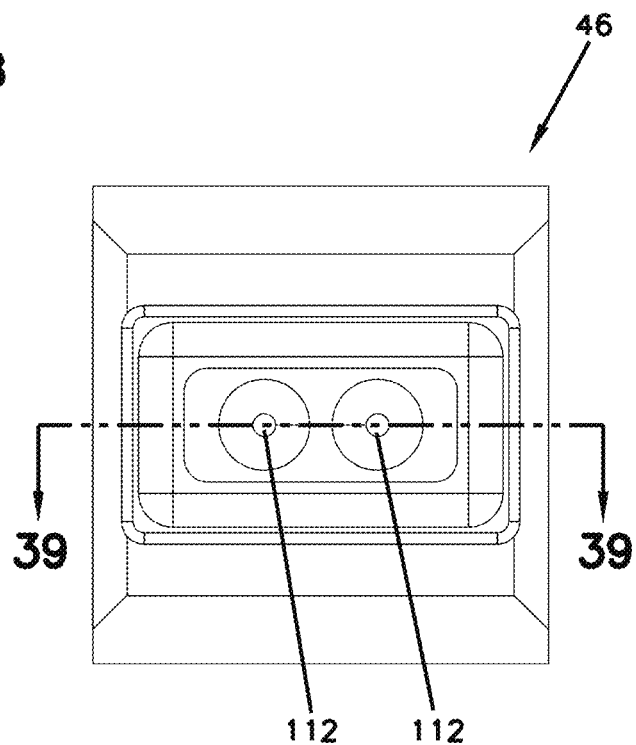
FIG. 38 is a rear view of the dust cap of FIG. 37.
Figure 39:
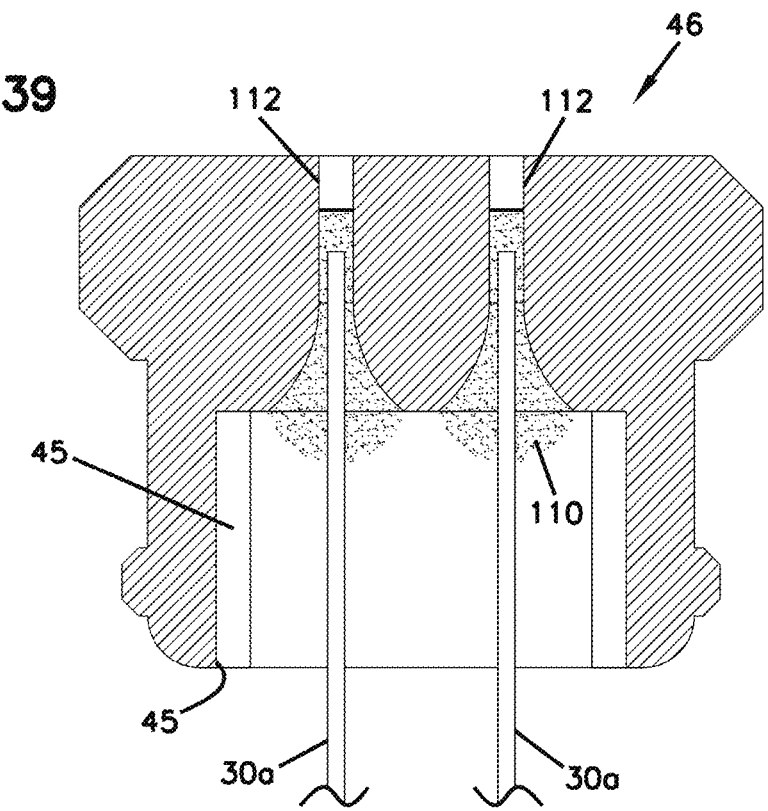
FIG. 39 is a cross-sectional view taken along section line 39-39 of FIG. 38.
Figure 40:
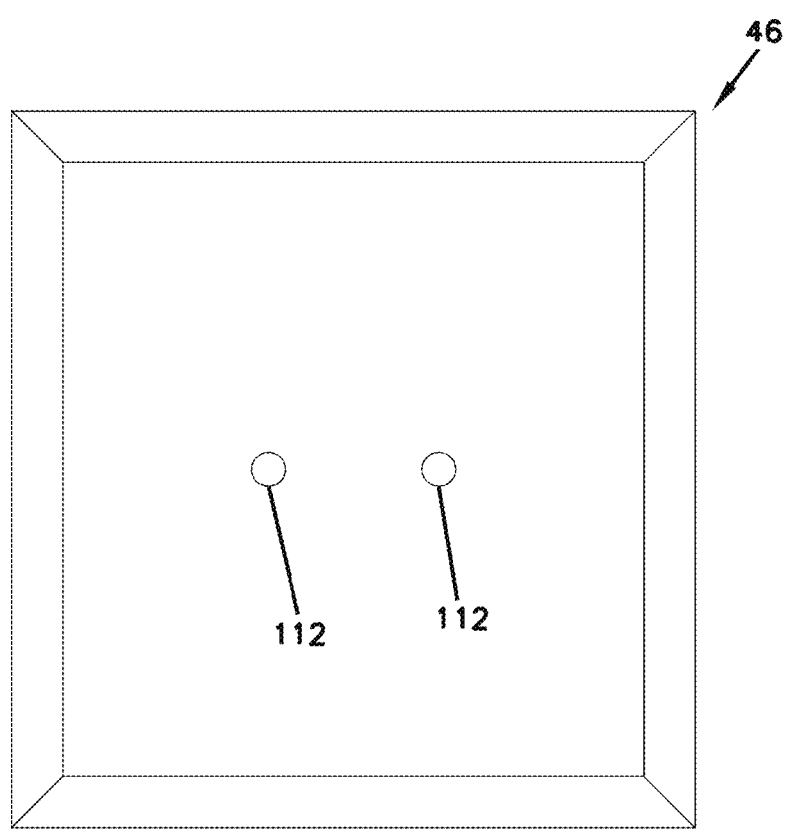
FIG. 40 is a front view of the dust cap of FIG. 37.
Figure 42:
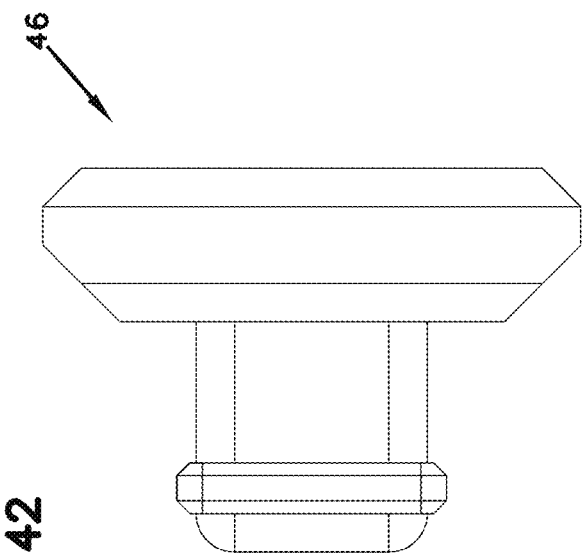
FIG. 42 is a second side view of the dust cap of FIG. 37.
Figure 44:
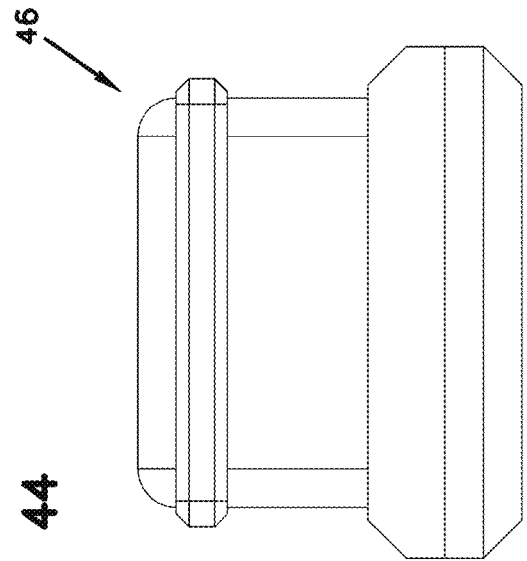
FIG. 44 is a bottom view of the dust cap of FIG. 37
Figure 41:
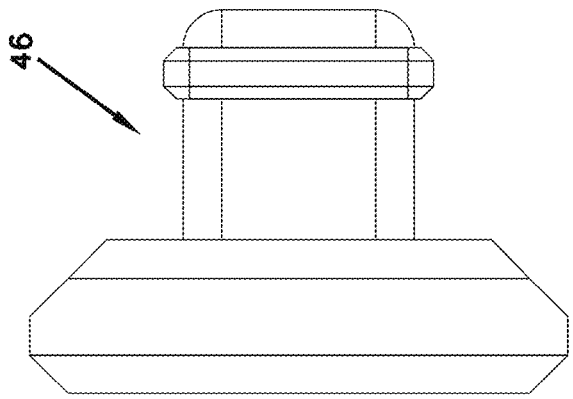
FIG. 41 is a first side view of the dust cap of FIG. 37.
Figure 43:
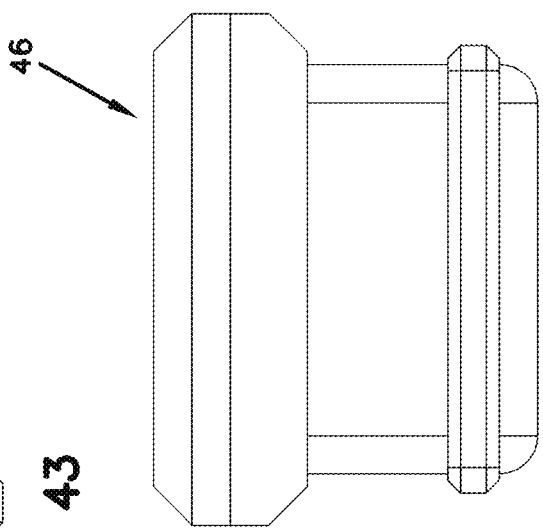
FIG. 43 is a top view of the dust cap of FIG. 37.

Referring to FIG. 3, the fiber optic adapter 24 includes an adapter housing 38 which defines the adapter ports 26. The fiber alignment structures 28 are mounted within the adapter housing 38. In certain examples, fiber alignment structures 28 can be mounted generally at a mid-plane of the adapter housing 38. The adapter housing can define the openings 36 for receiving the retention catches 34 of the flexible latches 32 of the duplex fiber optic connectors 22. The adapter ports 26 can include keyways 40 that receive corresponding keys 42 of the duplex fiber optic connectors 22. The keys 42 and keyways 40 can be configured to interface such that the duplex fiber optic connectors 22 can only be inserted into the adapter ports 26 in one orientation so as to provide a poka-yoke function. In certain examples, the keys 42 can be provided on only one side of the duplex fiber optic connectors 22 so as to provide a readily apparent visual and physical cue to an installer regarding the proper orientation of the duplex fiber optic connector 22 during insertion into the fiber optic adapter 24. As depicted, each of the duplex fiber optic connectors 22 includes two axially spaced-apart keys 42a, 42b (se FIG. 6) each having a width that extends substantially across an entire width of the duplex fiber optic connector 22. In certain examples, keys 42 have widths that extend across at least a majority of the width of the duplex fiber optic connector 22.

It will be appreciated that a variety of different types of fiber alignment structures can be used to provide coaxial alignment of the optical fibers of the duplex fiber optic connectors 22 desired to be optically coupled together. In the depicted example, the fiber optic adapter 24 includes a fiber alignment structure 28 having an elastomeric construction that allows the fiber alignment structure 28 to deform as optical fibers are inserted therein. The fiber alignment structures 28 can have an elastomeric construction and can be manufactured of materials such as silicone. The fiber alignment structure 28 can be referred to as ferrule-less fiber alignment structures since they provide optical fiber alignment without using or receiving ferrules (e.g., SC ferrules, LC ferrules, etc.). Example ferrule-less fiber alignment structures are disclosed in U.S. Provisional Patent Application Ser. No. 62/354,480 which is hereby incorporated by reference in its entirety. However, it will be appreciated that other types of fiber alignment structures can also be used. For example, other suitable fiber alignment structures are disclosed by PCT International Publication Nos. WO 2013/117598 and WO 2016/043922, which are hereby incorporated by reference in their entireties.

Figure 4:
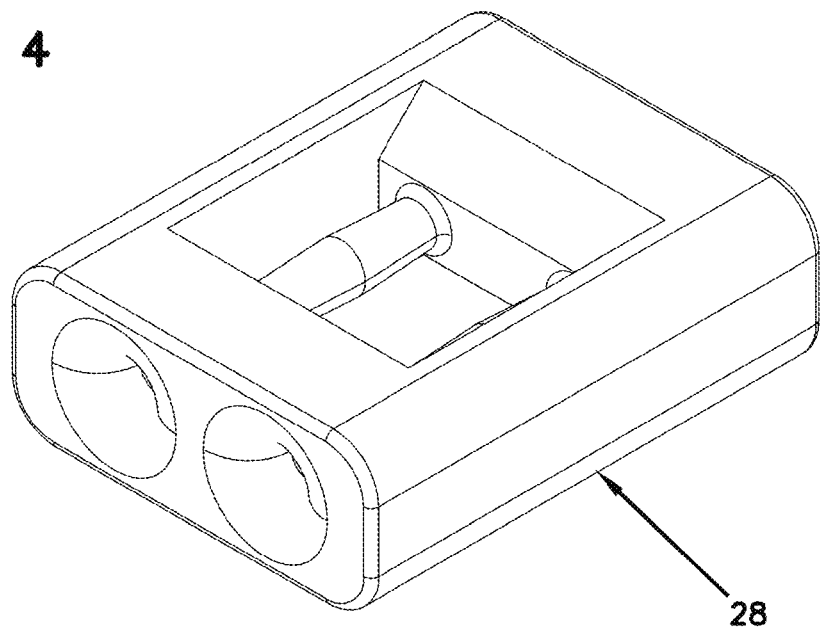
FIG. 4 is a perspective view showing an elastomeric fiber alignment structure incorporated within the fiber optic adapter of FIG. 3.
Figure 5:
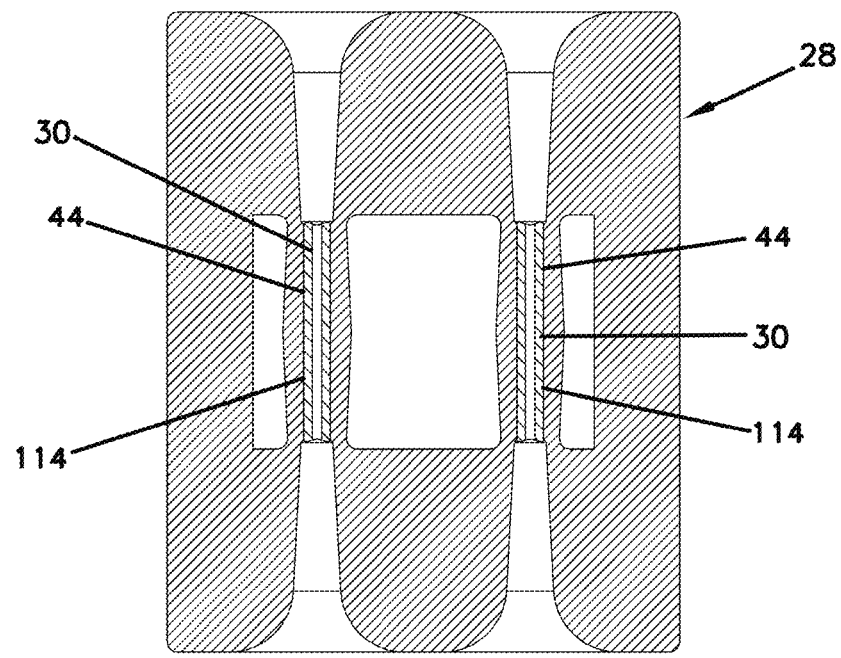
FIG. 5 is a cross-sectional view taken through the elastomeric optical fiber alignment structure of FIG. 4.

FIGS. 4 and 5 show example configurations for the fiber alignment structure 28. The elastomeric material of the fiber alignment structure 28 can define alignment passages 44 for receiving the optical fibers 30 (e.g., bare fiber end portions of the optical fibers 30) desired to be aligned with one another. The alignment passages 44 can elastomerically and elastically deform outwardly generally uniformly about the optical fibers 30 when the optical fibers are inserted therein. In certain examples, the alignment passages 44 can have different transverse cross-sectional shapes such as octagonal shapes, circular shapes, square shapes, or other shapes. In certain examples, the alignment passages 44 of the fiber alignment structure 28 are partially, or completely, filled with a non-gaseous fluid adapted to receive and protect the tips of the front end portions 30a of the fibers 30. In certain examples, a non-gaseous fluid 114 (see FIG. 5) can have a gel-like composition and can be configured to deform or flow in order to receive the tips of the front end portions 30a. In certain examples, the non-gaseous fluid 114 can include a gel such as an index matching gel. In certain examples, the fluid can clean the fiber tips as the fiber tips are inserted through the fluid.

FIGS. 6-10 illustrate one of the duplex fiber optic connectors 22 by itself. The duplex fiber optic connector 22 includes a dust cap 46, a connector body 48, an insert piece 50, a fiber anchoring component 52 and a boot 54. The dust cap 46 is further illustrated in FIGS. 37-44. The connector body 48 is further illustrated in FIGS. 11-20. The insert piece 50 is further illustrated in FIGS. 30-36. The fiber anchoring component 52 is further illustrated in FIGS. 21-29.

The connector body 48 includes a front end 56 (i.e., a plug end, an interface end, a distal end or like terms) and also includes a rear end 58 (i.e., a back end, proximal end or like terms). The dust cap 46 press-fits within a receptacle 60 defined at the front end 56 of the connector body 48. The insert piece 50 loads into the interior of the connector body 48 through the rear end 58 of the connector body 48. In certain examples, the insert piece 50 press-fits within the connector body 48 adjacent to the front end 56 of the connector body 48. Lateral projections 62 can assist in providing a press-fit interface between the connector body 48 and the insert piece 50. A slot 64 allows a front portion of the insert piece 50 to deform laterally inwardly as the projections 62 contact the inner sides of the connector body 48. The fiber anchoring component 52 also loads into the connector body 48 through the rear end 58 of the connector body 48. The fiber anchoring component 52 can be secured to the connector body 48 by a snap-fit connection. In one example, the snap-fit connection can be provided by arrow-shaped side rails 66 that slide and snap within corresponding side slots 68 defined by sidewalls of the connector body 48. The boot 54 mounts over a rear end of the fiber anchoring component 52. The fiber anchoring component 52 can include a shoulder 70 over which the boot 54 snaps to provide enhanced retention of the boot 54. It will be appreciated that the duplex fiber optic connector 22 mounts at the end of a duplex cable 72. The duplex cable 72 can include an outer jacket 74 surrounding a strength layer 76 (e.g., aramid yarn, fiberglass or other reinforcing structure). The jacket 74 can also contain two optical fibers 30 and optional buffer tubes can be used if desired. When the duplex fiber optic connector 22 is mounted to the duplex cable 72, the optical fibers 30 are routed through the interior of the duplex fiber optic connector 22 such that front end portions 30a of the optical fibers 30 can be accessed at the front end 56 of the connector body 48. The optical fibers 30 can be axially anchored or otherwise secured relative to the connector body 48 by the fiber anchoring component 52. The boot 54 provides bend radius protection at the interface between the duplex cable 72 and the fiber optic connector 22 and can have a flexible, molded plastic configuration. In certain examples, the boot 54 can be segmented.

Referring to FIG. 9, the flexible latches 32 are positioned at opposite sides of the connector body 48. For example, the flexible latches 32 are depicted at top and bottom sides of the connector body 48. By providing the flexible latches 32 at opposite sides of the connector body 48, symmetrical latching is provided within the fiber optic adapter 24. Such a symmetrical configuration assists in preventing the fiber optic connector 22 from pivoting, canting or skewing within its corresponding port 26 of the fiber optic adapter 24.

Referring still to FIG. 9, the flexible latches 32 are extended such that rear portions overlap a forward portion 55 of the boot 54. Thus, the forward portion of the boot 54 is located between the flexible latches 32 and the fiber anchoring component 52. In this way, the boot 54 can function as a positive stop that the flexible latches 32 can engage when forced together during the insertion process into the corresponding adapter port 26. The latches 32 are thus prevented from being stressed beyond their elastic limits.

As indicated above, the optical fibers 30 are preferably routed from the duplex cable 72 through the interior of the fiber optic connector 22. As depicted at FIGS. 9 and 10, the two optical fibers 30 extend through the fiber optic connector 22 and include the front end portions 30a which protrude beyond the front end 56 of the connector body 48. The fibers extend through alignment openings 49 defined by the front end of the connector body 48 (see FIGS. 16 and 17). The alignment openings 49 each communicate with separate longitudinal fiber buckling chambers 84 defined within the connector body 48.

It will be appreciated that the ferrule-less nature of the bare fibers 30 gives flexibility to the fibers 30. The flexibility of the fibers 30 also provides design flexibility in that a single form factor of the fiber optic connector 22 can be manufactured with a set center-to-center spacing that can be selected from a wide range of center-to-center spacing, e.g. numerous fiber optic connectors 22 can be manufactured with each having the same form factor yet each also having different pre-set center-to-center spacing. FIG. 17 provides one example of a form factor of the fiber optic connector 22 that is defined by D1 and D2. The pre-set, or pre-determined, center-to-center spacing of the optical fibers 30 for the fiber optic connector 22 can be selected from a range that includes a minimum to a maximum center-to-center spacing. In certain examples, the minimum center-to-center spacing of the optical fibers 30 within the fiber optic connector 22 is equivalent to the diameter of one of the bare optical fibers 30 (e.g., 0.125 micron fibers are immediately proximate each other with a 0.125 micron center-to-center spacing). In other examples, the minimum spacing can have a slight gap between the optical fibers 30. In certain examples, the maximum center-to-center spacing of the optical fibers 30 within the fiber optic connector is greater than or equal to two times the minimum center-to-center spacing, or greater than or equal to three times the minimum center-to-center spacing, or greater than or equal to four times the minimum center-to-center spacing, or greater than or equal to five times the minimum center-to-center spacing, or greater than or equal to six times the minimum center-to-center spacing, or greater than or equal to seven times the minimum center-to-center spacing. Alignment holes 49 are configured to accommodate the selected center-to-center spacing of the optical fibers 30.

Within the given form factor, different fiber optic connectors 22 having different center-to-center spacings S (see FIG. 17) between the alignment holes 49 can be manufactured. In this way, different fiber optic connectors 22 can be manufactured to be compatible with different components (e.g., adapters, ROSA/TOSA modules, etc.) having fiber optic connection interfaces with different fiber spacing. While the spacing S between the alignment holes 49 and, possibly, the buckling chambers 84, can be modified, the remainder of the fiber optic connector 22 need not be re-designed and can remain unchanged.

Figure 53:
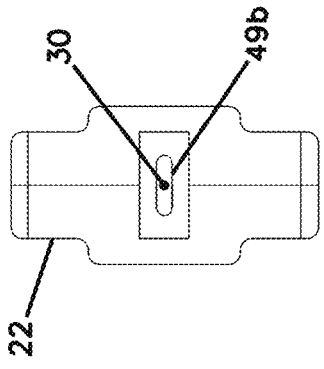
FIG. 53 is a front view a front view of a modified version of the connector body of FIG. 11.
Figure 52:
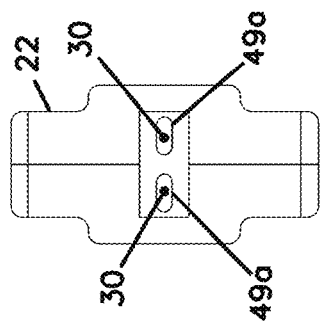
FIG. 52 is a front view a front view of a modified version of the connector body of FIG. 11.

The above describes an example of a fiber optic connector 22 where the fibers 30 are non-adjustable after manufacture (e.g., the spacing between the fibers 30 is set by the designed spacing S between the alignment holes 49). However, in other examples, referring to FIGS. 52-53, the fiber alignment holes of the fiber optic connector 22 can be configured to allow lateral movement between the optical fibers relative to one another (e.g., along a plane that intersects the cores of the optical fibers 30). For example, as shown at FIG. 52, fiber alignment holes 49a are elongated laterally to permit adjustment of the center-to-center spacing of the fibers 30. FIG. 53 shows fibers 30 received in one elongated fiber alignment hole 49b which allows the center-to-center spacing of the fibers to be adjusted after manufacture of the fiber optic connector 22. The lateral movability of the fibers 30 enables a narrowing or widening of the center-to-center spacing of the fibers 30 to match the center-to-center spacing of an adapter, e.g., adapter 24, or other receptacle to which the fiber optic connector 22 is coupled. For example, the fibers 30 can float or move in a lateral plane to self-adjust to a hole spacing of a corresponding adapter as the fibers 30 are received in the adapter.

Figure 54C:
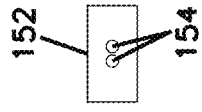
FIG. 54(A)-54(C) are front views of inserts that are configured to interface with the connector bodies of FIGS. 52 and 53.
Figure 54B:
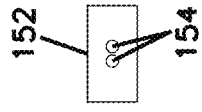
Figure 54A:

Referring to FIGS. 54(A)-54(C), in certain examples, the lateral movement of the fibers 30 within elongated alignment hole(s) 49a, 49b can be set after manufacture of the fiber optic connector 22 by using in insert 152, having standard alignment holes 154, that can be loaded into the fiber optic connector 22. Different inserts 152 having different center-to-center spacing can be selected to accommodate the center-to-center spacing of the adapter, e.g., adapter 24, or other receptacle to which the fiber optic connector 22 will be coupled. With the insert 152 in place within the fiber optic connector 22, the center-to-center spacing of the fibers 30 is set. In certain examples, the insert 152 is removable and replaceable with another insert 152 having a different center-to-center spacing. The inserts 152 can be snapped in place, glued in place, or otherwise secured into the fiber optic connector 22.

Referring once again to FIGS. 9 and 10, because the front end portions 30a of the optical fibers 30 protrude forwardly beyond the front end 56 of the connector body 48, the end faces of the front end portion 30a can be processed after the optical fibers 30 have been anchored relative to the connector body 48 (e.g., via epoxy or other adhesive injected into the fiber anchoring component 52). By processing the end faces of the front end portions 30a after the optical fibers 30 have been anchored relative to the connector body 48, an exact length L can be established between the tips of the front end portions 30a and the retention catches 34 of the flexible latches 32. The dimension L is significant for ensuring proper positioning of the fiber tips of the optical fibers 30 within the fiber optic adapter 24 and for controlling the amount of fiber buckling that occurs within the fiber optic connector 22. Example techniques for processing the end faces of the front end portions 30a include fiber polishing, electric arc treatment, plasma treatment, laser treatment, or other forms of treatment. As shown at FIG. 7, the front end 56 of the connector body 48 can include one or more concavities 61 for enhancing access to the tips of the front end portions 30a. As depicted, the concavities 61 can be provided above and below the optical fibers at the end face of the connector body 42. One of the concavities 61 can be defined within a portion of the key 42a. The concavities can optionally include curved or straight surfaces. As depicted, each concavity 61 includes first and second concave surfaces 61a, 61b that meet at an intersection point located generally at a midpoint between the optical fibers 30. Other shaped recesses or depressions can also be used.

In certain examples, the front end portions 30a of the optical fibers 30 are not supported by a ferrule or ferrules. In certain examples, front end portion 30a can therefore be referred to as free-end portions. In certain examples, the free-end portions 30a can be bare-fiber portions. In certain examples, a coated-fiber portion 30b can extend from the bare-fiber portions back through the connector body 48 and the fiber anchoring component 52 to the duplex cable 72. Such a coating can assist in protecting the optical fibers and preventing fiber breakage during buckling. While it is preferred for the front end portions 30a to be bare fibers, in other examples, a coating or other layer may be provided on the front end portions 30a. Further, in other examples, the entire portions of the optical fibers extending forwardly from the fiber anchoring component can have a bare fiber configuration.

In a preferred example, the duplex fiber optic connector 22 includes separate fiber buckling chambers 84 corresponding to each of the optical fibers 30. Thus, a single optical fiber 30 is received in each of the fiber buckling chambers 84. The fiber buckling chambers 84 can be defined in part by the connector body 48 and in part by the fiber anchoring component 52. In certain examples, the connector body 48 includes a divider wall 86 (see FIGS. 19 and 20) that extends lengthwise along the interior of the connector body 48 and functions to separate the two fiber buckling chambers 84. The fiber buckling chambers 84 are depicted as having generally parabolic or semi-elliptical transverse cross-sectional shapes (see FIG. 18). The divider wall 86 has a base end at the top of the connector body 48 and a free end that engages the insert piece 50. The insert piece 50 includes a front shelf 88 that fits within a notch 90 defined at the front end of the connector body 48. Behind the front retention shelf 88, the insert piece 50 includes an elevated platform 91 including bump structures 92 (see FIG. 30) that align with each of the fiber buckling chambers 84. The bump structures 92 are adapted to engage the optical fibers 30 to provide the optical fibers 30 with a minimal pre-defined bend prior to the fiber optic connector 22 being coupled to another fiber optic connector 22. Because the optical fibers 30 are positioned within the fiber buckling chambers 84 with pre-disposed bends caused by the bump structures 92, the optical fibers 30 are predisposed to readily buckle within the fiber buckling chambers 84 when an optical connection is made. In view of the optical fibers 30 being slightly bent, it is not necessary to overcome a substantial column force (which typically would be present in a straight fiber) before buckling can be initiated. It will be appreciated that the fiber buckling chambers 84 are also defined in part by the fiber anchoring component 52.

Referring to FIGS. 21-29, the fiber anchoring component 52 includes an inner chamber 94 for receiving adhesive material (e.g., epoxy) for fixing the optical fibers 30 relative to the fiber anchoring component 52. A port 96 is provided for injecting the adhesive material into the inner chamber 94. The inner chamber 94 includes a number of different sections. For example, the inner chamber 94 can include a first enlarged section 98 for receiving the cable jacket 74 or a buffer tube. The inner chamber 94 can also include a second section 100 with which the port 96 communicates. The second section 100 has a reduced cross-sectional profile as compared to the first section (e.g., a reduced diameter). The second section 100 can receive both of the optical fibers 30 as well as a short section of the strength layer 76. When adhesive is injected into the inner chamber 94, coated portions of the optical fibers 30 as well as the strength layer 76 can be adhesively affixed in the second section 100 of the inner chamber 94. The fiber anchoring component 52 can also include separate passages 102 in communication with the second section 100. The second passages 102 can include narrow portions 104 that closely approximate the size of the coated optical fibers such that adhesive is prevented from flowing from the inner chamber 94 to the second passages 102. The second passages 102 can also include transition sections 106 which gradually increase in cross-sectional area and buckling chamber sections 108 that cooperate with the structure of the connector body 48 to define the fiber buckling chambers 84. Thus, forward sections of the fiber buckling chambers 84 are defined by the connector body 48 while rear sections of the fiber buckling chambers 84 are defined by the buckling chamber sections 108 of the fiber anchoring component 52. The buckling chamber sections 108 can have parabolic or semi-elliptical transverse cross-sectional shapes similar to the shape of the fiber buckling chamber sections defined by the connector body 48.

In certain examples, the forward portion of the connector body 48 has a form factor that is closely toleranced with respect to the shape of the ports 26 of the fiber optic adapter 24, see FIGS. 1-2. In certain examples, a clearance of 0.002 inches or less is defined between the sidewalls of the connector body 48 and the sides of the adapter ports 26. Similarly, similar clearance can be provided between the top and bottom walls of the connector body 48 and the top and bottom walls of the ports 26. Such close tolerancing can assist in preventing the fiber optic connector 22 from pivoting, canting, or skewing within the adapter port 26.

In certain examples, the flexible latches 32 can be positioned on opposite sides of the reference plane P (see FIGS. 16 and 17) that bisects both of the optical fibers 30 of the duplex fiber optic connector 22. The form factor at the front end of the connector body 42 can have a major dimension D1 and a minor dimension D2 (see FIG. 17). The reference plane P can be parallel to the minor dimension. The major dimension D1 is enlarged to provide space within the connector for fiber buckling.

The dust cap 46 of the duplex fiber optic connector 22 is adapted to mount at the front end 56 of the connector body 48. In certain examples, dust cap 46 is secured to the front end 56 of the connector body 48 by a press-fit connection. For example, the dust cap 46 can include an exterior outwardly projecting ridge or rim 43 that press-fits within the receptacle 60 defined at the front end 56 of the connector body 48.

Dust cap 46 is adapted to receive the front end portions 30a of the optical fibers 30. In certain examples, the dust cap 46 can contain a non-gaseous fluid 110 (see FIG. 39) adapted to receive and protect the tips of the front end portions 30a. In certain examples, the non-gaseous fluid 110 can have a gel-like composition and can be configured to deform or flow in order to receive the tips of the front end portions 30a. In certain examples, the tips of the front end portions 30a are imbedded within the non-gaseous fluid 110. In one example, the back side of the dust cap defines a major opening 47 into an internal cavity 45 of the dust cap, and the vent openings 112 are defined through a primarily closed front side of the dust cap.

In certain examples, the dust cap 46 can include one or more vent openings 112 which are at least partially filled with the non-gaseous fluid 110. The vent openings 112 can be configured to allow air to be vented from the interior of the dust cap 46 when the non-gaseous fluid is applied therein. In certain examples, the non-gaseous fluid 110 at least partially fills the vent openings 112. It will be appreciated that the dust cap 46 preferably has one vent opening 112 corresponding to each of the optical fibers 30, and the forward portions 30a of the fibers extend at least partially into the vent openings 112. It will also be appreciated that the front end portions 30a of the optical fibers 30 extend into the non-gaseous fluid 110 and partially into their corresponding vent openings 112. In other examples, only one vent opening may be provided. In still other examples, the dust cap 46 may include more vent openings than the number of optical fibers provided with the fiber optic connector. In other examples, the dust cap 46 could be used with fiber optic connectors having a single optical fiber or fiber optic connectors having more than two optical fibers. Aspects of the dust cap 46 are also applicable to fiber optic connectors where the optical fibers are supported by ferrules. In certain examples, non-gaseous fluid can include a gel such as an index matching gel. In certain examples, non-gaseous fluid can at least partially fill the vent opening or openings as to prevent contamination from entering the dust cap through the vent openings. In certain examples, the fiber tips of the optical fibers 30 are at least partially imbedded within the non-gaseous fluid. In certain examples, the non-gaseous fluid functions to clean the end faces of the optical fibers 30 when the end faces are inserted therein. In certain examples, the non-gaseous fluid generally maintains its shape but has a viscosity that allows the non-gaseous fluid to flow or otherwise move so as to receive the fiber tips of the optical fibers 30.

Figure 46:
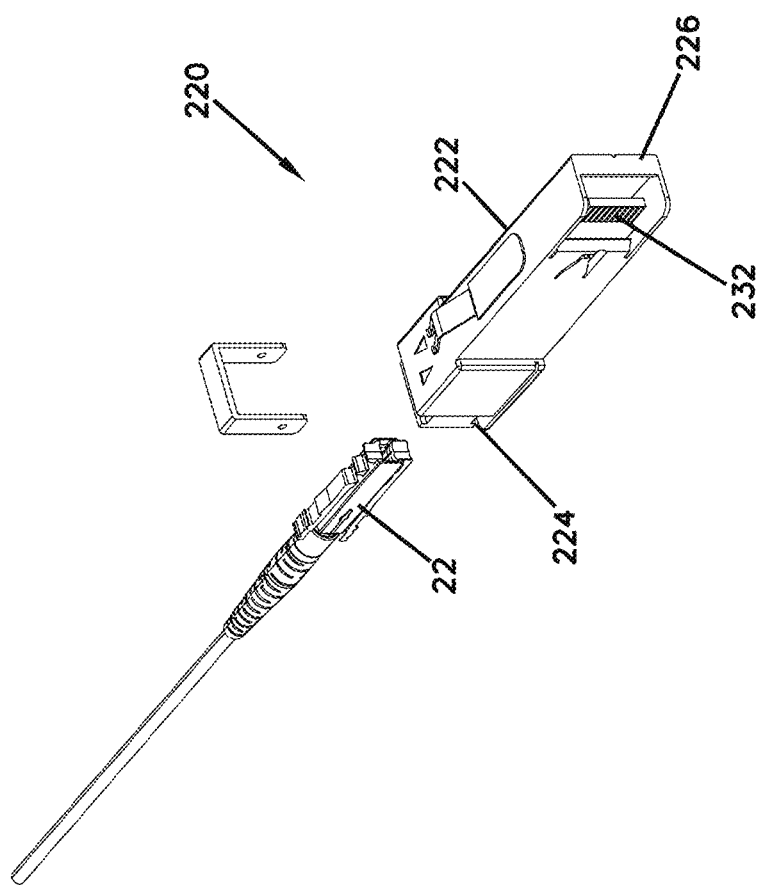
FIG. 46 is a second perspective view of the optical transceiver module of FIG. 45.
Figure 47:
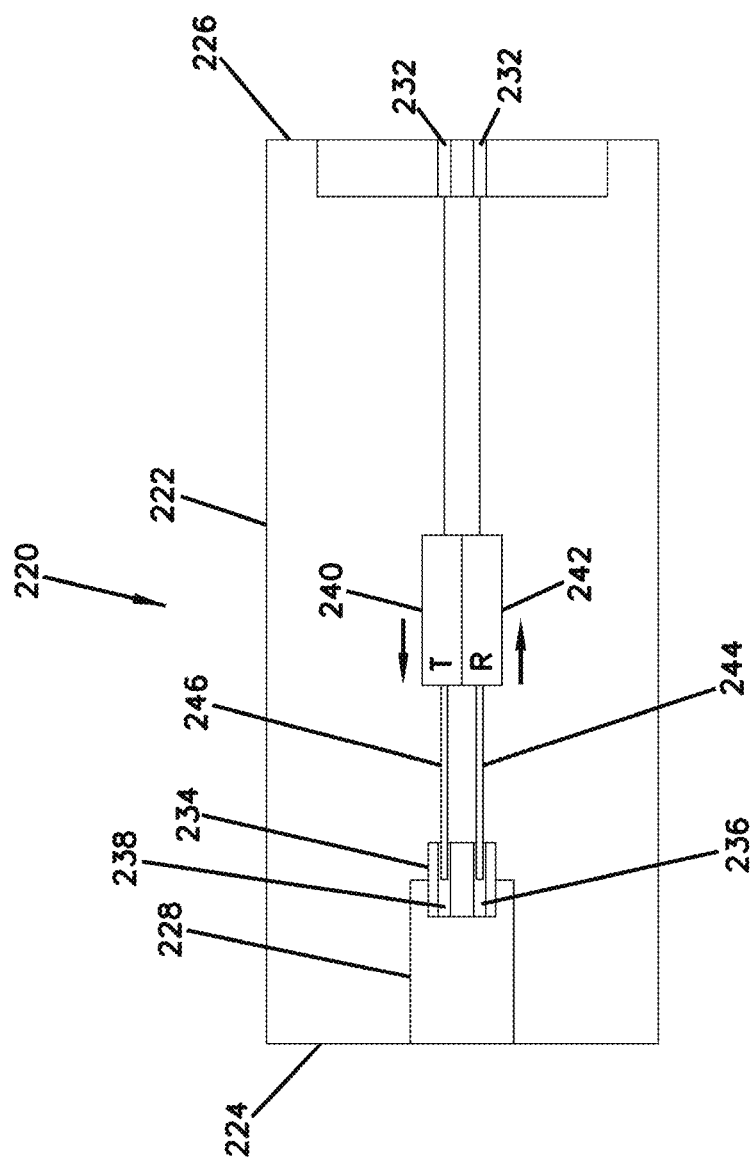
FIG. 47 is a schematic depiction of the optical transceiver module of FIG. 45.

FIGS. 45-47 show an optical transceiver module 220 adapted to interface with one of the duplex fiber optic connectors 22. The optical transceiver module 220 includes a housing 222 having a first end 224 and a second end 226. An optical interface is provided at the first end 224 and an electrical interface is provided at the second end 226. The optical transceiver module 220 can also include contacts for receiving power and can be configured for transmitting electrical power through the electrical interface at the second end 226 and for directing power to active components (optical to electrical converters and electrical to optical converters) within the housing 222. In one example, the optical transceiver module 220 can have an industry standard form factor such as an SFP (Small Form-factor Pluggable) form factor.

The optical interface at the first end 224 of the housing 222 can include a port 228 for receiving one of the duplex fiber optic connectors 22. The port 228 can have the same configuration as the previously described adapter port 26. The electrical interface at the second end 226 of the housing 222 can include electrical contacts 232. The electrical contacts 232 are depicted as electrically conductive pads (e.g., card-edge contacts) supported on a printed circuit board, but could also be conductive springs or other electrically conductive elements. The optical interface can also include an optical fiber alignment structure 234 at the port 228 for aligning non-ferrulized optical fibers to provide optical coupling (e.g., detachable/disengageable optical connections) between non-ferrulized optical fibers. The fiber alignment structure 234 can have the same configuration or configurations described with respect to the previously described fiber alignment structure 28. As shown at FIG. 47, the fiber alignment structure 234 can include first and second fiber alignment passages 236, 238 for individually receiving the optical fibers 30 of the duplex optical connector 22 when the optical connector 22 is inserted in the port 228.

The optical transceiver module 220 can includes a transmit component 240 (e.g., a light emitting component) and a receive component 242 (e.g., a light receiving component). The transmit component 240 and the receive component 242 are electrically connected to separate electrical contacts 232 at the electrical interface of the optical transceiver module (e.g., via electrical paths such as wires or tracings) and are optically coupled to the optical interface (e.g., via optical fibers). The transmit component can include structure for converting electrical signals to optical signals (an electrical to optical converter) and can include a light emitter. An example structure can include a laser diode such as a Vertical Cavity Surface Emitter Laser (VCSEL) or an edge emitting laser. The receive component can include structure for converting optical signals into electrical signals (e.g., an optical to electrical converter). An example structure can include a photodiode. The optical transceiver module 220 also includes first and second optical fibers 244, 246 having first ends received respectively within the fiber alignment passages 236, 238 of the fiber alignment structure 234. When the fiber optic connector 22 is inserted in the port 228, the fiber alignment structure 234 causes (e.g., through mechanical co-axial alignment) the optical fibers 244, 246 to be optically coupled to the optical fibers 30 of the fiber optic connector 22. A second end of the first optical fiber 244 can be optically coupled to the receive component 242 by a direct optical connection such as an optical surface mount connection. A second end of the second optical fiber 246 can be optically coupled to the transmit component 240 by a direct optical connection such as an optical surface mount connection.

In certain examples, referring to FIG. 50, the fiber alignment structure 234 is configured to receive optical fibers 30 from the fiber optic connector 22 that have a first center-to-center spacing and couple them to optical fibers 244, 246 having a second center-to-center spacing. The second center-to-center spacing can be larger than the first center-to-center spacing as seen in FIG. 50 or smaller than the first center-to-center spacing. In such a configuration, the fiber alignment passages 236, 238 of the fiber alignment structure 234 extend angularly relative to one another from one end of the fiber alignment structure 234 to the other end of the fiber alignment structure 234 to accommodate the difference between the first and second center-to-center spacing. It will be appreciated that the angles of the fiber alignment passages may be exaggerated for illustration purposes. Accordingly, the fiber alignment structure 238 can be designed to accommodate different receive component 242 and transmit component 240 configurations/spacing.

In certain examples, referring to FIG. 51, the fiber alignment passages 236, 238 of the fiber alignment structure 234 remain parallel to one another and fibers 244, 246 converge/diverge relative to each other to alter the center-to-center spacing of the optical fibers 244, 246 as the fibers extend from the fiber alignment structure 234 to the receive and transmit components 242, 240. In certain examples, the optical fibers 244, 246 are replaced entirely, or in part, by planar light guides. In certain examples, the ends of the optical fibers 244, 246 at the receive and transmit components 242, 240 include ferrules, e.g. LC ferrules, that are received at a fiber optic adapter (e.g., a structure having resilient ferrule alignment split sleeves for coaxially aligning ferrules) for coupling the ferruled fibers 244, 246 to the components 242, 240. In certain examples, the optical fibers 244, 246 are not ferruled and are directly connected to the components 242, 240 through optical surface mount connections to a planar light circuit or other structure. In other examples, an adapter similar to the adapter 24 can be used at the interface with the components 242, 240.

The optical transceiver module 220 can have a relatively low-cost and low-loss construction as compared to prior art optical transceiver modules. For example, as compared to some prior art optical transceiver modules, the optical transceiver module 220 can include alignment structures for providing optical connection between ferrule-less optical fibers. Thus cost associated with ferrules, fiber optic connectors having ferrules, and ferrule-based alignment systems can be eliminated. Additionally, some prior art optical transceiver units include ROSA and TOSA cans that respectively receive and transmit light signals across air gaps. Such structures can include fairly expensive optical interfaces and the air gaps can result in signal loss. In contrast, the transceiver module 220 can include structure that does not require light signals to traverse an air gap.

Figure 48:
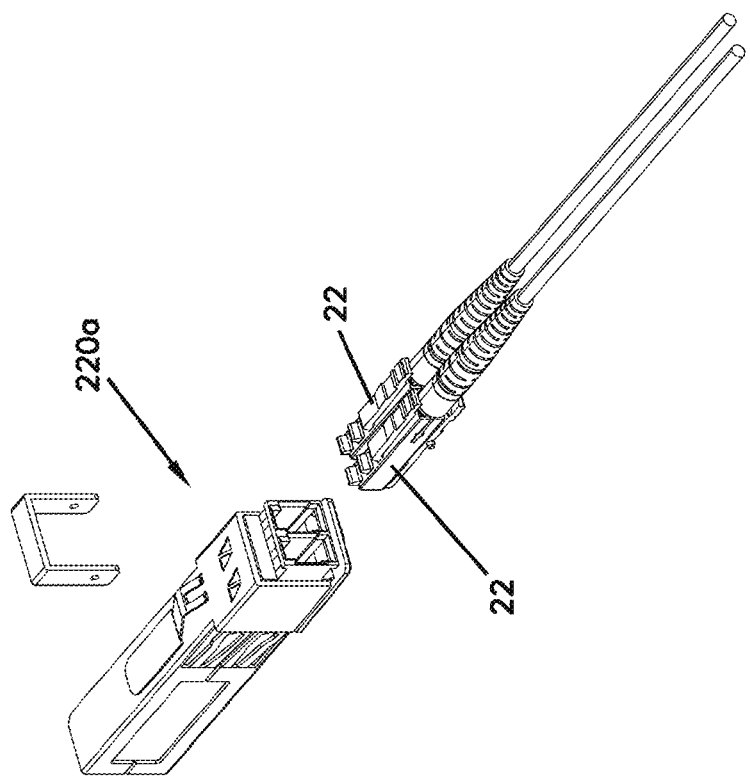
FIG. 48 is a first perspective view of an optical transceiver module adapted to interface with two of the duplex fiber optic connectors of FIG. 6.
Figure 49:
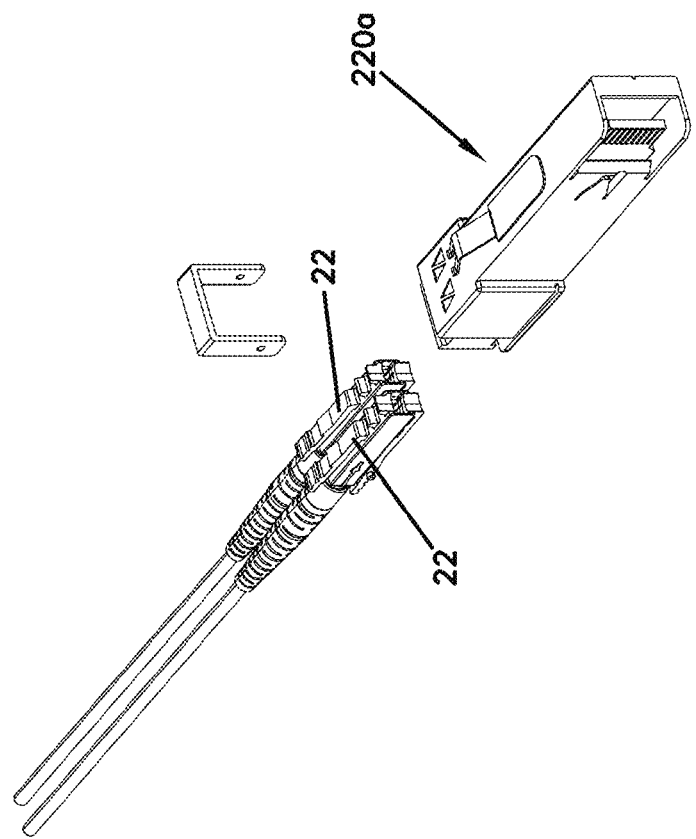
FIG. 49 is a second perspective view of the optical transceiver module of FIG. 48.

FIGS. 48 and 49 depict another optical transceiver module 220a in accordance with the principles of the present disclosure. The optical transceiver module 220a is adapted for receiving two of the duplex fiber optic connectors 22 and has the same configuration as the optical transceiver module 220 except for including twice as many optical/electrical circuits and corresponding components.

It will be appreciated that certain aspects of the present disclosure are applicable to duplex fiber optic connectors. However, certain aspects are also applicable to fiber optic connectors having more than two optical fibers. Additionally, certain aspects are applicable to fiber optic connectors having only a single optical fiber. Similarly, certain aspects of the present disclosure are particularly applicable to ferrule-less fiber optic connectors, but also have applicability to ferruled fiber optic connectors. For example, vent features of the dust cap are applicable to both ferruled and ferrule-less fiber optic connectors and are also applicable to single fiber connectors as well as multi-fiber connectors. Additionally, the latch arrangement disclosed herein is particularly applicable to duplex ferrule-less connectors, but is also applicable to single-fiber ferrule-less connectors, single-fiber ferruled connectors and multi-fiber connectors of any fiber count regardless of whether the multi-fiber connectors have ferrules or are ferrule-less.

Aspects of the present disclosure also relate to arrangements, positioning strategies, and size-reducing technology for enhancing the circuit density of optical transceiver modules. In certain examples, the circuit density of an optical transceiver module having an SFP form factor can be enhanced. In certain examples, the circuit density of an optical transceiver module having an SFP form factor can be doubled. In certain examples, an optical transceiver module having an SFP form factor can be designed to include at least two receiver optical subassemblies (ROSA) and at least two transmitter optical subassemblies (TOSA) paired with the receiver optical subassemblies. Aspects of the present disclosure are also applicable for increasing the circuit density for other types of modules having form factors other than an SFP form factor.

Figure 55:
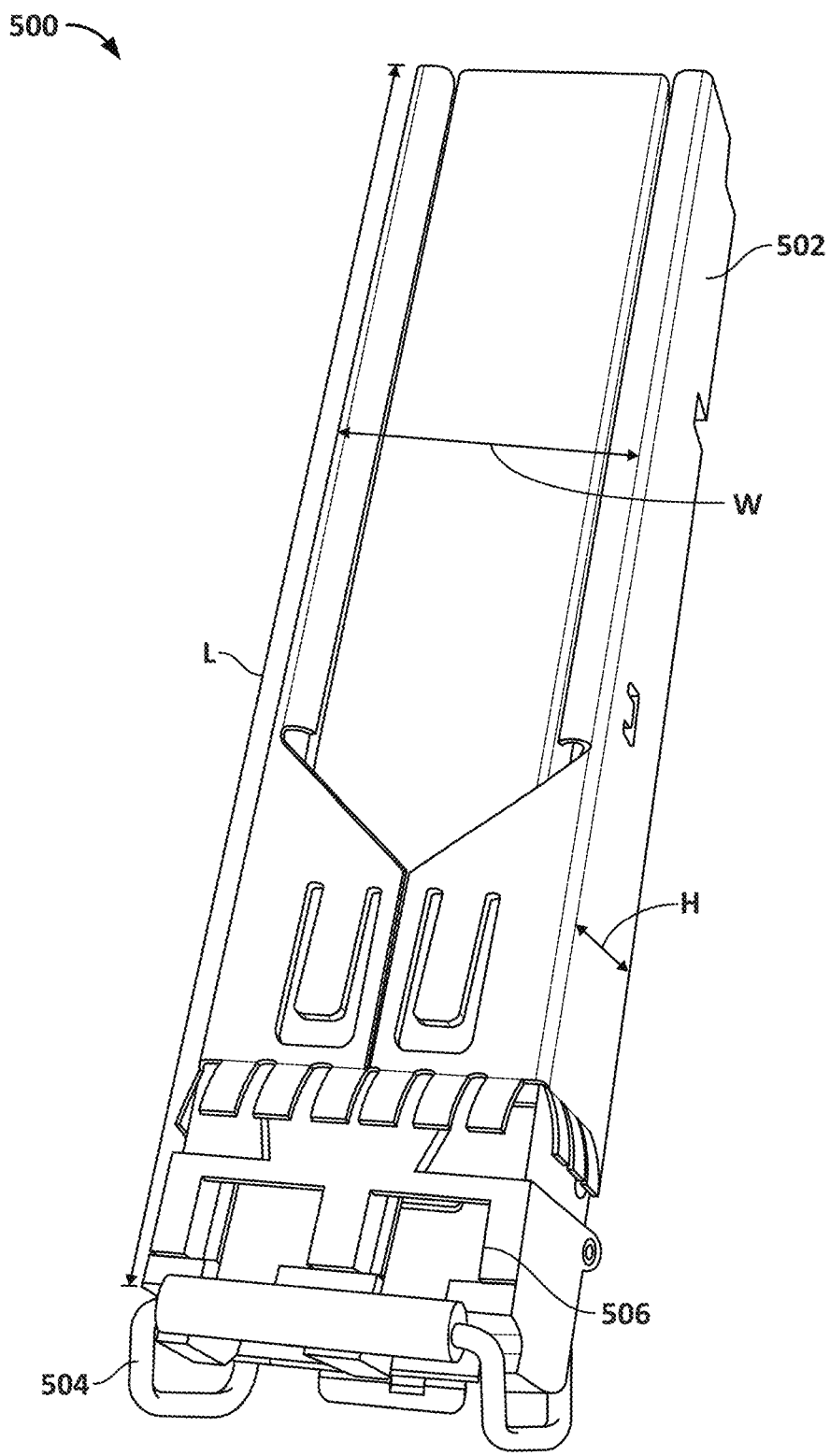
FIG. 55 depicts a prior art optical transceiver module having an SSP form factor.

FIG. 55 depicts a prior art optical transceiver module 500 having an SFP form factor. The optical transceiver module 500 includes an outer housing 502 that is generally rectangular and typically has a metal construction. In one example, the housing 502 has a length L less than or equal to 56.5 millimeters (mm), a width W less than or equal to 13.4 mm and a height H less than or equal to 8.5 mm. In another example, the housing can have a length less than 60 mm, a width less than 15 mm and a height less than 10 mm. One end of the optical transceiver module 500 defines a pair of optical ports which include a transmit optical port 504 and a receive optical port 506. The optical ports 504, 506 are configured to receive LC fiber optic connectors. The other end of the optical transceiver module 500 incudes a card edge connector 508 having contacts 509 for sending and receiving electrical signals corresponding to optical signals sent and received at the optical ports 504, 506.

Figure 56:
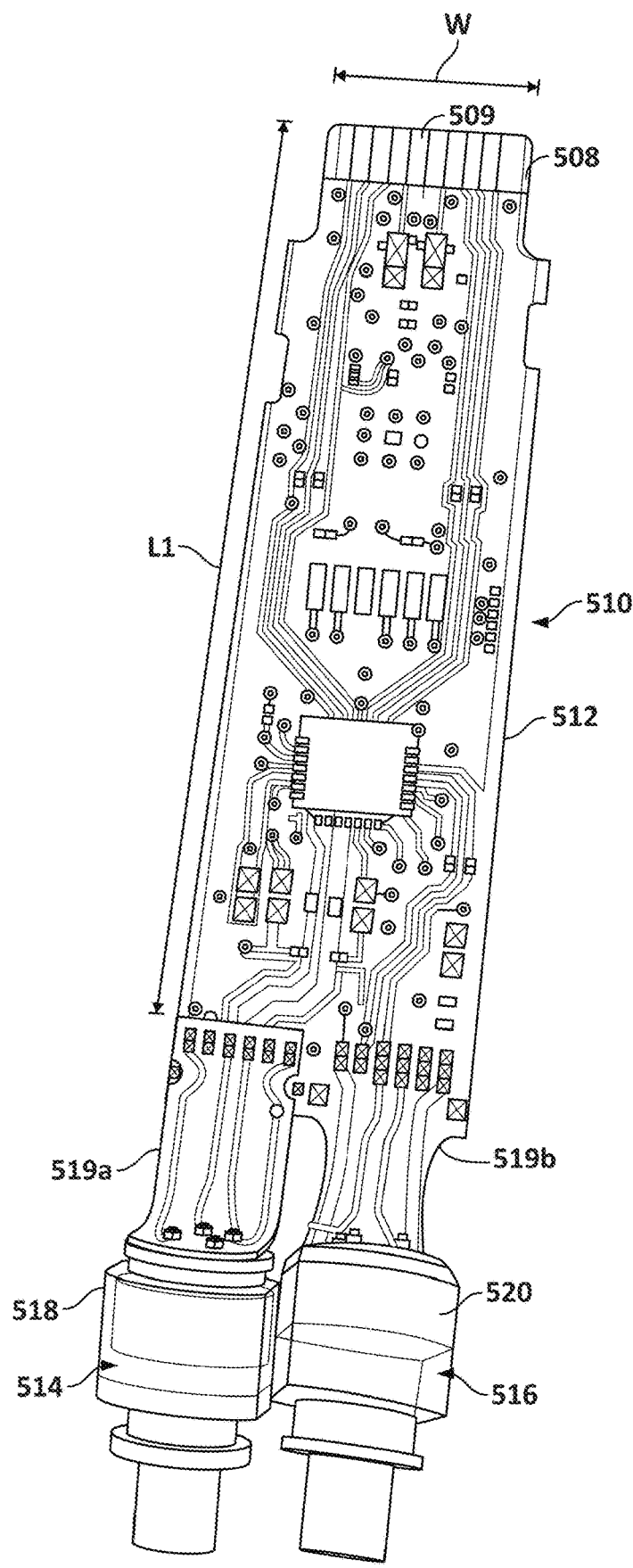
FIG. 56 depicts an internal circuit board arrangement of the optical transceiver module of FIG. 55.

FIG. 56 depicts an internal assembly 510 of the optical transceiver module 500 that is housed within the outer housing 502. The internal assembly includes a printed circuit board 512 having a length L1 less than or equal to 46 mm, and a width W1 less than or equal to 12 mm. The card edge connector 508 is positioned at one end of the printed circuit board 512. A TOSA 514 and a ROSA 516 are positioned at the opposite end of the printed circuit board 512. The TOSA 514 corresponds to the transmit optical port 504 and the ROSA 516 corresponds to the receive optical port 506. The TOSA 514 and the ROSA 516 are electrically connected to the printed circuit board 512 by flexible circuits 519a, 519b. The TOSA 514 includes a TOSA housing 518 (i.e., a TOSA can) and the ROSA 516 includes a ROSA housing 520 (i.e., a ROSA can). The optical ports 504, 506 are sized and shaped to receive LC fiber optic connectors.

Figure 57:
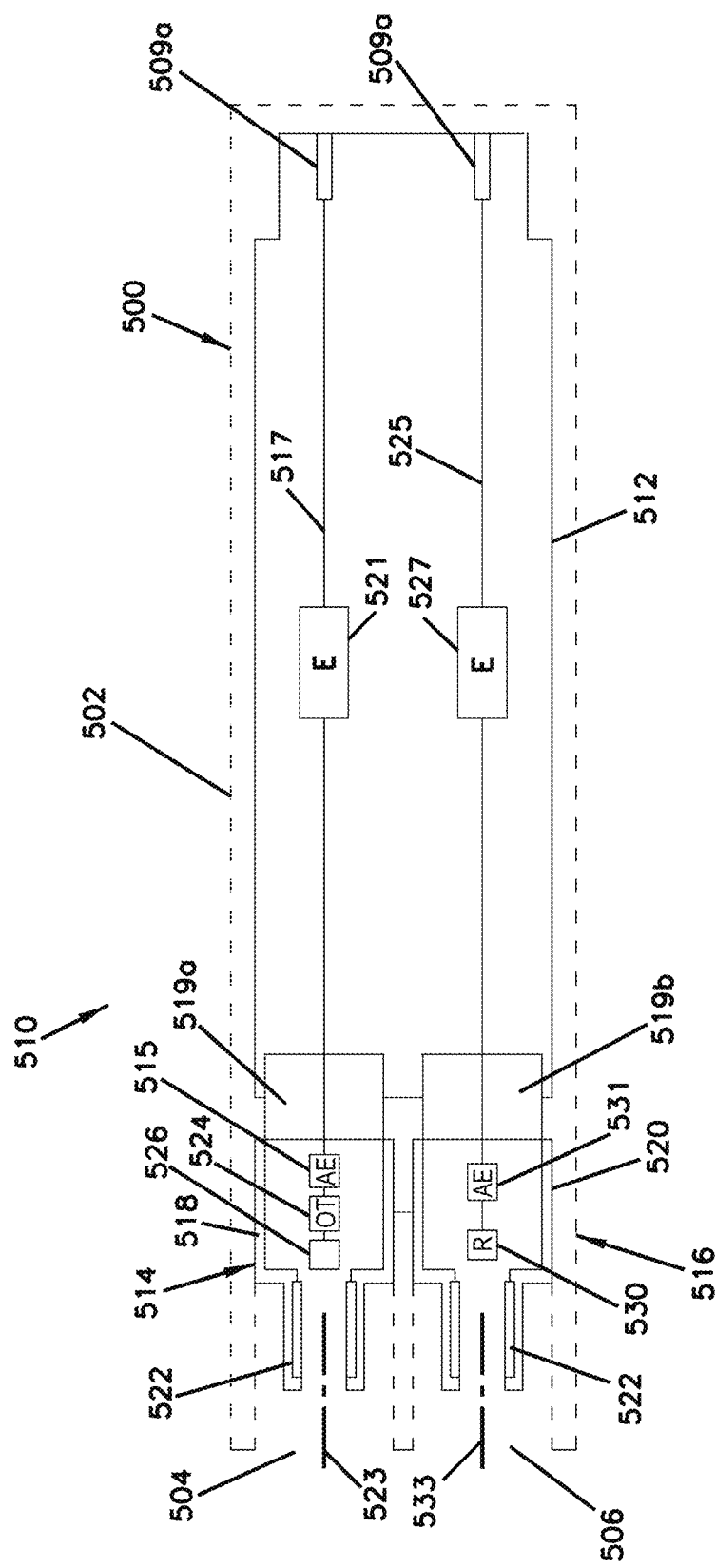
FIG. 57 is a schematic depiction of the prior art optical transceiver module of FIG. 55.

FIG. 57 schematically depicts the internal assembly 510 of the optical transceiver module 500. The TOSA 514 and the ROSA 516 each include a ferrule alignment sleeve 522 housed within their corresponding housings 518, 520. The ferrule alignment sleeves 522 have inner diameters of about 1.25 millimeters and are adapted for receiving LC ferrules of LC fiber optic connectors having lengths of about 7 millimeters. The alignment sleeves 522 align with the optical ports 504, 506.

The TOSA 514 includes an optical transmitter 524 and a lens 526 within the TOSA housing 518. The TOSA 514 includes active electronics 515 for converting an electrical signal received by the optical transceiver module 500 via one of the contacts 509a of the card edge connector 509 into an optical signal that is transmitted out the transmit optical port 504 by the optical transmitter 524 and lens 526. The electrical signal can be received from a card edge connector mated with the card edge connector 509 of the transceiver module 500. The optical transmitter 524 and the lens 526 are intersected by a central axis 523 of the alignment sleeve 522 within the TOSA housing 518. In use, an LC ferrule of an LC fiber optic connector inserted within the transmit optical port 504 is received in the ferrule alignment sleeve 522 such that an optical fiber supported by the LC ferrule is co-axial with the central axis 523 and aligned with the lens 526 and the optical transmitter 524. The electrical signal received by the contact 509a from the mated card edge connector is carried to the active electronics 515 by a conductive path 517 (e.g., tracings) on the printed circuit board 512 and the flex circuit 519a. Further electronics 521 (e.g., active and/or passive electronics) can also be provided on the circuit board 512 for amplifying, filtering, and/or otherwise processing the signals. The electrical signal is converted to an optical signal by the active electronics 515 of the TOSA 14 and is transmitted to the optical fiber of the ferrule by the transmitter 524 and the lens 526. In one example, the transmitter 524 transmits the optical signal along the central axis 523 toward the optical fiber supported by the ferrule, and the lens 526 focuses the optical signal on the end of the optical fiber.

The ROSA 516 includes an optical receiver 530 within the ROSA housing 520. The ROSA 516 includes active electronics 531 for converting an optical signal received by the optical transceiver module 500 through the optical receiver port 506 into an electrical signal that is output from the transceiver module 500 via one of the contacts 509b of the card edge connector 509. The optical receiver 530 is intersected by a central axis 533 of the alignment sleeve 522 within the ROSA housing 520. In use, an LC ferrule of an LC fiber optic connector inserted into the receive optical port 506 is received in the ferrule alignment sleeve 522 such that an optical fiber supported by the LC ferrule is co-axial with the central axis 523 and aligned with the optical receiver 530. The optical fiber within the LC ferrule received by the ferrule alignment sleeve 522 directs an optical signal along the central axis 533 toward the optical receiver 530. The optical signal is received by the optical receiver 530 and the signal is converted from an optical signal to an electrical signal by the active electronics 531. The electrical signal from the active electronics 531 is carried by a conductive path 525 (e.g., tracings) on the printed circuit board 512 and the flex circuit 519b to the contact 509b where the signal can be output from the module 500 to an electrical card edge connector mated with the card edge connector of the printed circuit board 512. Further electronics 527 (e.g., active and/or passive electronics) can also be provided on the circuit board 512 for amplifying, filtering, and/or otherwise processing the signals.

Aspects of the present disclosure relate to arrangements that use non-ferrule alignment technology to reduce TOSA and ROSA size in an optical transceiver module. In certain examples, ferrule alignment sleeves can be eliminated from each TOSA and ROSA to reduce size. In certain examples ferrule-less fiber alignment structures such as bare fiber alignment structures or coated fiber alignment structures can be used. In certain examples, the ferrule-less fiber alignment structures can have relatively small diameter fiber alignment openings (e.g., less than or equal to 300, 275, 250, 225, 200, 175, 150 or 130 microns). In certain examples, the fiber alignment openings have lengths no greater than 5, 4 or 3 millimeters and actual alignment sections having lengths no greater than 2 or 1 millimeters. Additionally, unlike ferrules, optical fibers are flexible. Therefore, an optical fiber will not function as a moment arm/level arm capable of transfers loading to the optical transceiver module. Hence, it is possible to design the ROSA and TOSA housings with less robust constructions and thinner walls to reduce the overall size. The ferrule-less fiber alignment structures can be of the type described and/or referenced above.

Figure 58:
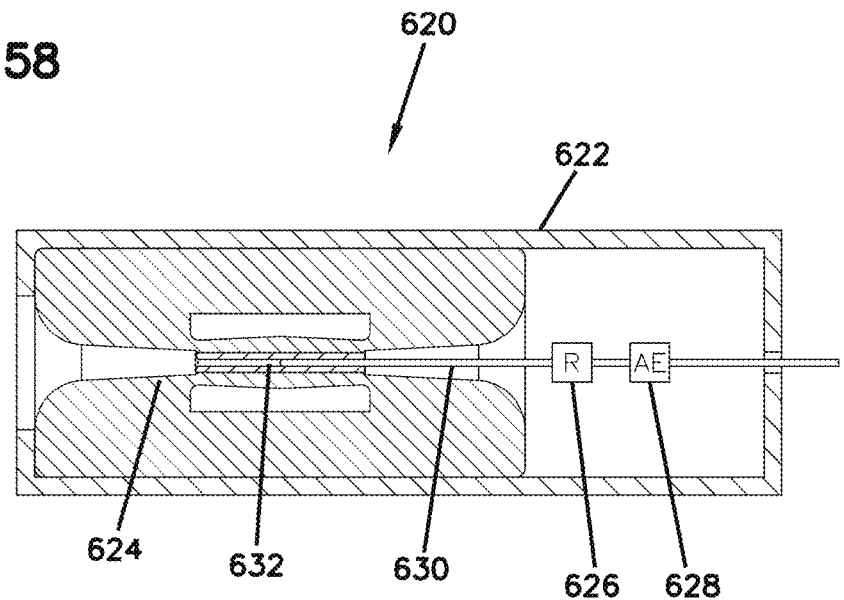
FIG. 58 depicts a receiver optical subassembly constructed in accordance with the principles of the present disclosure.

FIG. 58 depicts a ROSA 620 in accordance with the principles of the present disclosure. The ROSA 620 includes a ROSA housing 622 which can include a dielectric (e.g., plastic) construction. Other materials are also contemplated. A ferrule-less fiber alignment structure 624 is enclosed within the ROSA housing 622. It will be appreciated that the ferrule-less fiber alignment structure 624 can be of the type described and/or referenced above. The ROSA 620 can also include an optical receiver 626 and active electronics 628 within the ROSA housing 622 for converting an optical signal received by the optical receiver 626 into an electrical signal. In the depicted example, an optical fiber 630 is shown factory installed within the ferrule-less fiber alignment structure 624. One end of the optical fiber 630 is positioned at an alignment portion 632 of the ferrule-less fiber alignment structure 624 while an opposite end of the optical fiber 630 is positioned adjacent to the optical receiver 626. In certain examples, the optical fiber 630 can be secured within the ferrule-less fiber alignment structure 624 by adhesive. Additionally, a gel or other substance can be provided within the ferrule-less fiber alignment structure 624 to provide fiber cleaning when the ferrule-less fiber alignment structure 624 receives the fiber of an optical connector intended to be optically coupled to the ROSA 620.

It will be appreciated that the active electronics 628 of the ROSA 620 can be electrically coupled to the printed circuit board of an optical transceiver module by known techniques such as flexible circuit boards, electrically conductive wires, electrically conductive posts or other structures. Such structures can also mechanically connect the ROSA to the printed circuit board of the transceiver module. In one example, the ROSA 620 can replace the ROSA 516 of the optical transceiver module 500 with the active electronics 628 electrically coupled to the conductive path 525.

When a fiber optic connector is optically coupled with the ROSA 620, an optical fiber of the fiber optic connector is received within the ferrule-less fiber alignment structure 624 and the end of the optical fiber of the fiber optic connector is coaxially aligned with the optical fiber 630 pre-installed within the ROSA 620. In this way, optical signals can be transferred between the optical fiber of the fiber optic connector and the optical fiber 630. The optical fiber 630 functions to carry optical signals between the optical fiber of the fiber optic connector and the optical receiver 626. The ROSA 620 is compatible with a ferrule-less fiber optic connector having an optical fiber that is unsupported by a ferrule. The unsupported optical fiber of the fiber optic connector is adapted to be received within the ferrule-less fiber alignment structure 624 of the ROSA 620.

Figure 59:
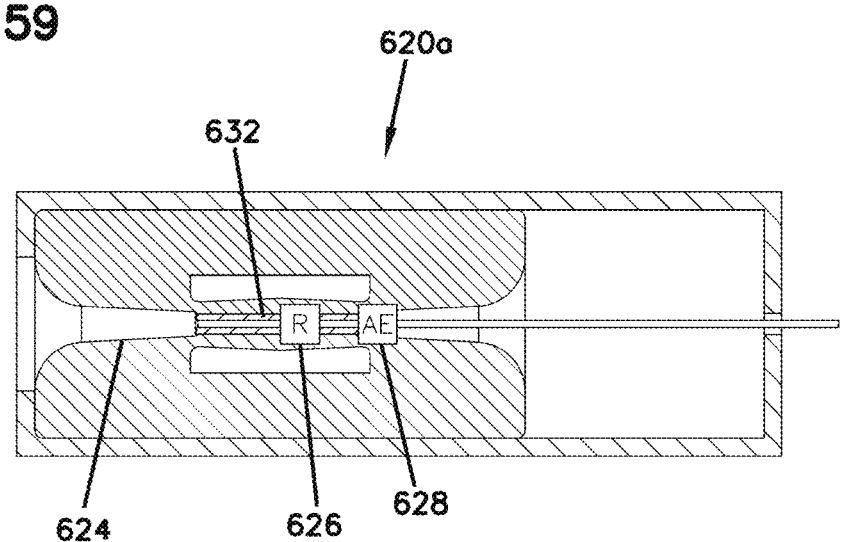
FIG. 59 depicts another receiver optical subassembly in accordance with the principles of the present disclosure.

FIG. 59 depicts another ROSA 620a in accordance with the principles of the present disclosure. The ROSA 620a of FIG. 59 has the same components as the ROSA 620 of FIG. 58 except the optical fiber 630 has been eliminated. In the ROSA 620a of FIG. 59, the optical receiver 626 has been moved closer to the fiber alignment structure 624 and/or incorporated into the ferrule-less fiber alignment structure 624. When a ferrule-less fiber optic connector interfaces with the ROSA 620a, a fiber of the fiber optic connector is received within the ferrule-less fiber alignment structure 624 and aligned directly with the optical receiver 626. Thus, a signal from the optical fiber of the fiber optic connector can be received by the optical receiver 626 and converted to an electric signal by the active electronics 626. The active electronics 626 can be electrically connected to a circuit board of a transceiver module by an electrical pathway such as a pathway provided on a flexible circuit board, by conductive wires, by conductive posts or by other like structures.

While the active electronic 626 has been depicted herein separately from the optical receivers and/or the optical transmitters, it will be appreciated that such structure can be independent structure or can be incorporated as part of the optical receivers and/or the optical transmitters.

Figure 60:
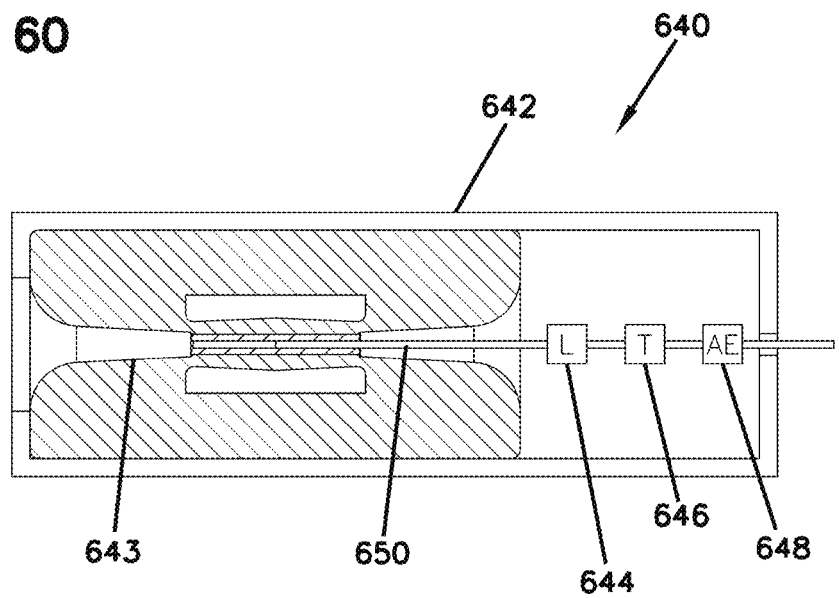
FIG. 60 depicts a transceiver optical subassembly in accordance with the principles of the present disclosure.

FIG. 60 shows a TOSA 640 in accordance with the principles of the present disclosure. The TOSA 640 includes a TOSA housing 642. In one example, TOSA housing 642 can have a dielectric construction and can include a polymeric material such as plastic. Other materials are also contemplated. The TOSA 640 includes a ferrule-less fiber alignment structure 643 positioned within the TOSA housing 642. It will be appreciated that the ferrule-less fiber alignment structure 643 can have the same type of construction as the ferrule-less alignment structures described previously in this description and/or referenced by this description. The TOSA 640 also includes a lens 644, a transmitter 646 and active electronics 648 positioned within the TOSA housing 642. The active electronics 648 is adapted for converting electrical signals received from a circuit board or other structure of a transceiver module into optical signals that are transmitted by the transmitter 646 or the lens 644. The lens 644 is adapted to focus the transmitted optical signals at the end of an optical fiber 650 mounted within the TOSA housing 642. Optical fiber 650 can be factory installed within the TOSA housing 642. Specifically, optical fibers 650 can be factory installed within the ferrule-less fiber alignment structure 643. One end of the optical fiber 650 can be positioned adjacent to and in alignment with the focal point of the lens 644. The other end of the optical fiber 650 can be positioned generally at the center of an alignment section of the ferrule-less fiber alignment structure 643. When a ferrule-less fiber optic connector is mated with the TOSA 640, an optical fiber of the ferrule-less fiber optic connector is received within the ferrule-less fiber alignment structure 643 and oriented in co-axial alignment with the optical fiber 650. In this way, optical signals can be readily transmitted between the optical fiber of the mated fiber optic connector and the optical fiber 650 of the TOSA 640. The active electronic 648 of the TOSA 640 can be electrically connected to a circuit board of a transceiver module. For example, structures such as flexible printed circuit boards, electrical wires, electrical posts, or other structures can be used to electrically connect the active electronics 648 to electric pathways of the transceiver module and can also be used to mechanically secure the TOSA 640 to a structure such as a printed circuit board of the transceiver module.

Figure 61:
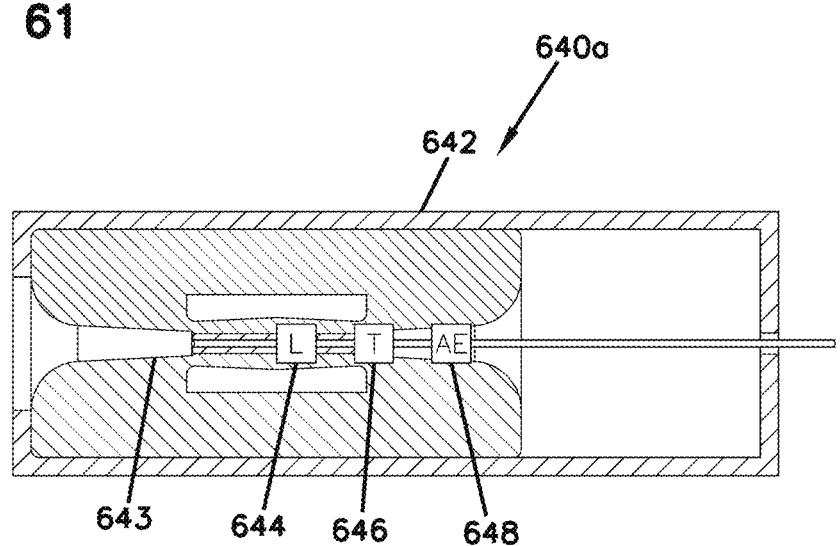
FIG. 61 depicts another transceiver optical subassembly in accordance with the principles of the present disclosure.

FIG. 61 shows a TOSA 640a having the same components as the TOSA 640 of FIG. 60 except the optical fiber 650 has been eliminated. Instead, the lens 644 has been moved closer to or incorporated into the ferrule-less alignment structure 643. In this way, when a ferrule-less fiber optic connector is mated with the TOSA 640a, an optical fiber of the fiber optic connector is placed in close proximity and in alignment with a focal point of the lens 644. By this configuration, optical signals can be transmitted directly between the end of the optical fiber of the mated fiber optic connector and the lens 644 thereby eliminating the need for an intermediate optical fiber such as the optical fiber 650.

Figure 62:
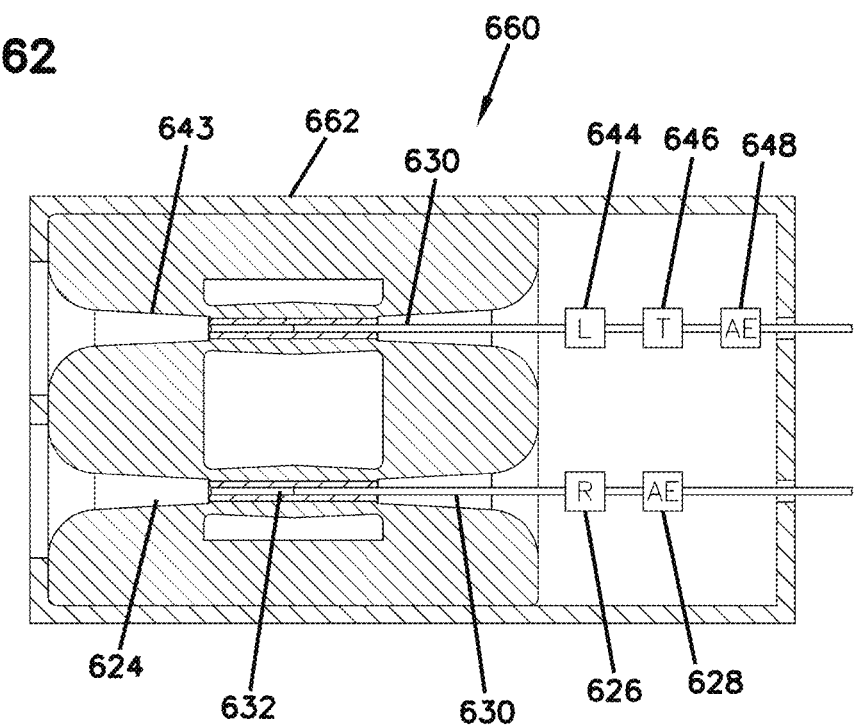
FIG. 62 depicts a combined receiver and transceiver optical subassembly in accordance with the principles of the present disclosure.

FIG. 62 depicts a combined transmit and receive optical subassembly 660 (TROSA) in accordance with the principles of the present disclosure. The TROSA 660 includes the internal components of the ROSA 620 and the internal components of the TOSA 640 incorporated within a single TROSA housing 662. The TROSA 660 can have a duplex configuration. The TROSA housing 662 can have a dielectric construction. In one example, the TROSA housing 662 is made of a polymeric material such as plastic. The internal components of the TROSA 660 can be the same as those previously described with regard to the ROSA 620 and the TOSA 640 and the internal components have been provided with like reference numbers. The TROSA 660 can be incorporated as part of a transceiver module. For example, the TROSA 660 can be electrically and mechanically coupled to a circuit board of a transceiver module by known structures such as flexible printed circuit boards, electrical wires, conductive posts, or other like structures. In the depicted example, the TROSA 660 has a duplex configuration adapted to interface with a duplex ferrule-less fiber optic connector such as one of the duplex fiber optic connectors 22. In certain examples, optical fibers 30 of one of the duplex fiber optic connectors 22 can be received within the ferrule-less fiber alignment structures 624, 643 so as to be optically coupled with the optical receiver 626 and the optical transmitter 646 of the TROSA 660.

Figure 63:
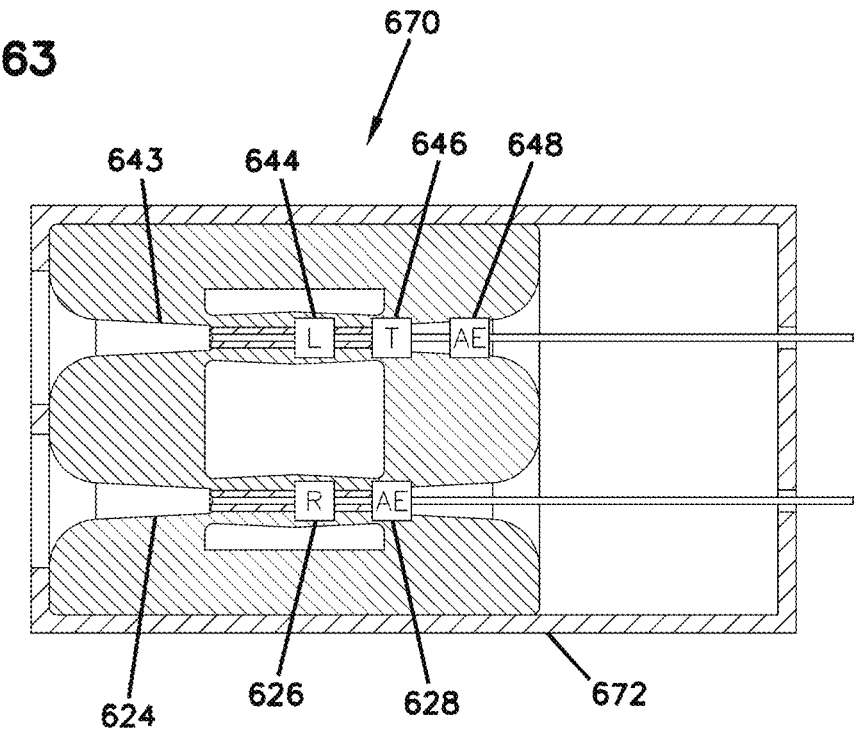
FIG. 63 depicts another combined receiver and transceiver optical subassembly in accordance with the principles of the present disclosure.

FIG. 63 depicts a TROSA 670 in accordance with the principles of the present disclosure. The TROSA 670 includes the components of the ROSA 620a and the TOSA 640a incorporated within a single TROSA housing 672 (the components have been provided with like reference numbers). TROSA housings 672 can have a dielectric construction. In one example, the TROSA housing 672 can include a polymeric construction such as plastic. In the depicted example, the TROSA 670 has a duplex configuration adapted to interface with a duplex ferrule-less fiber optic connector such as one of the duplex fiber optic connectors 22. In certain examples, optical fibers 30 of one of the duplex fiber optic connectors 22 can be received within the ferrule-less fiber alignment structures 624, 643 so as to be optically coupled with the optical receiver 626 and the optical transmitter 646 of the TROSA 670. The TROSA 670 is adapted to interface with a corresponding component of a transceiver. For example, the TROSA 670 can be electrically and mechanically mounted to a circuit board of a transceiver module of the type previously described by structure such as a flexible printed circuit board, electrical wires, electrical posts or like structures.

Figure 64:
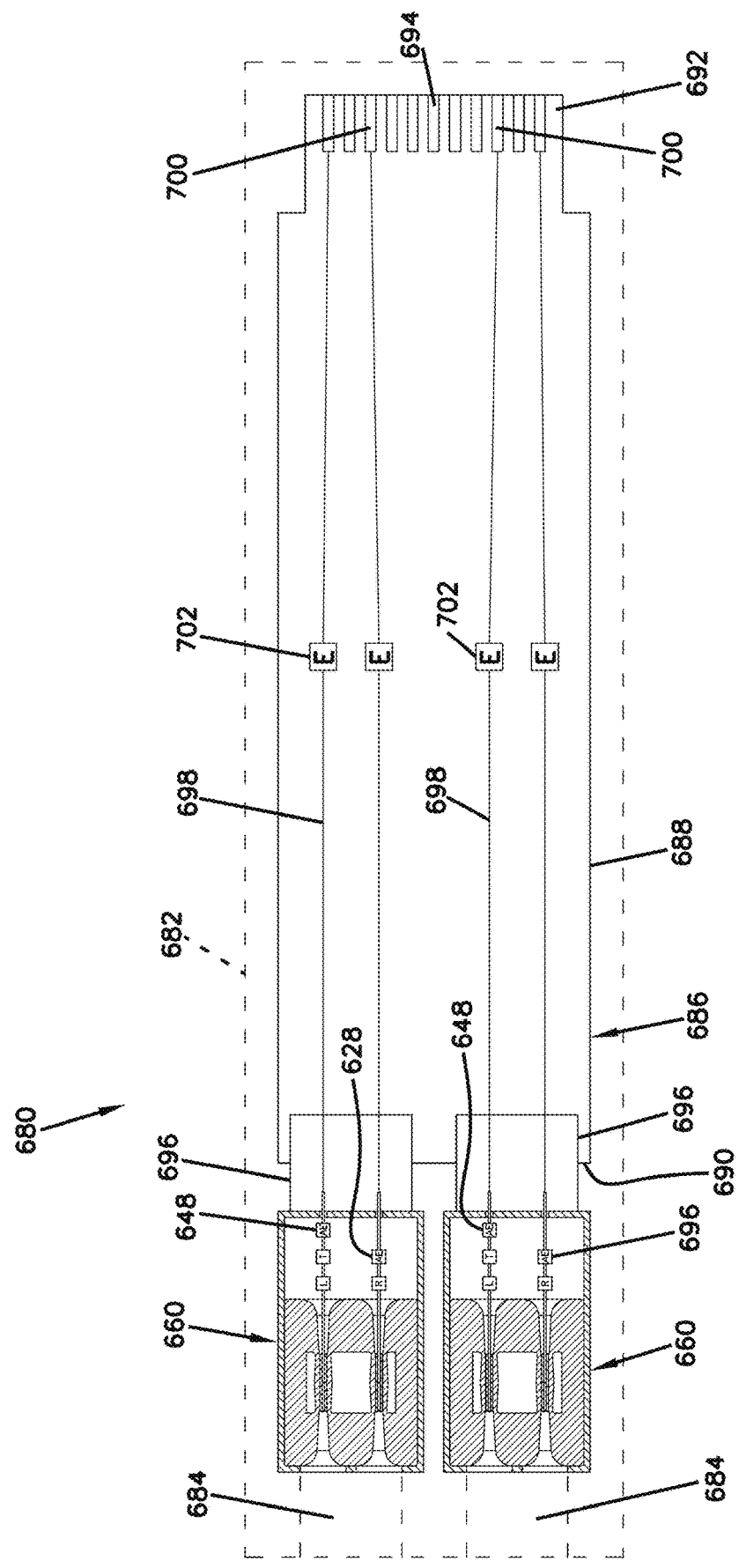
FIG. 64 depicts an optical transceiver module in accordance with the principles of the present disclosure incorporating two of the combined receiver and transceiver optical subassemblies of FIG. 62.

FIG. 64 depicts a transceiver module 680 in accordance with the principles of the present disclosure. Transceiver modules 680 include an outer housing 682. In one example, the outer housing 682 can have a metallic construction. In one example, the outer housing 682 can have a form factor compatible with an industry standard form factor such as an SFP form factor. In certain examples, the outer housing 682 can define connector ports 684 for receiving ferrule-less fiber optic connectors such as two of the duplex ferrule-less fiber optic connectors 22. The transceiver module 680 also includes an internal component 686 that mounts within the outer housing 682. Internal components 686 can include a printed circuit board 688 having a first end 690 and an opposite second end 692. An electrical connector such as an electrical card edge connector 694 is positioned at the second end 692. It is contemplated that other types of electrical connectors can be used as well. Two of the TROSAs 660 are mounted at the first end 690 of the printed circuit board 688. The TROSAs 660 are shown electrically and mechanically connected to the printed circuit board 688 by flexible circuit boards 696. It will be appreciated that other connecting structures such as electrical wires, electrical posts or like structures could also be used. Active electronics 628, 648 of the TROSAs 660 are electrically connected to conductive pathways 698 provided on the flexible circuit boards 696 and the printed circuit boards 688. The conductive pathways 698 electrically connect the active electronics 628, 648 to electrical contacts 700 (e.g., electrical pads) provided at the electrical connector 694. Additional electronics 702 can be provided on the printed circuit board 688 for processing signals transmitted through the conductive pathways 698. It will be appreciated that the transceiver module 680 is adapted to provide two pairs of ROSAs and TOSAs within an SSF form factor.

Figure 65:
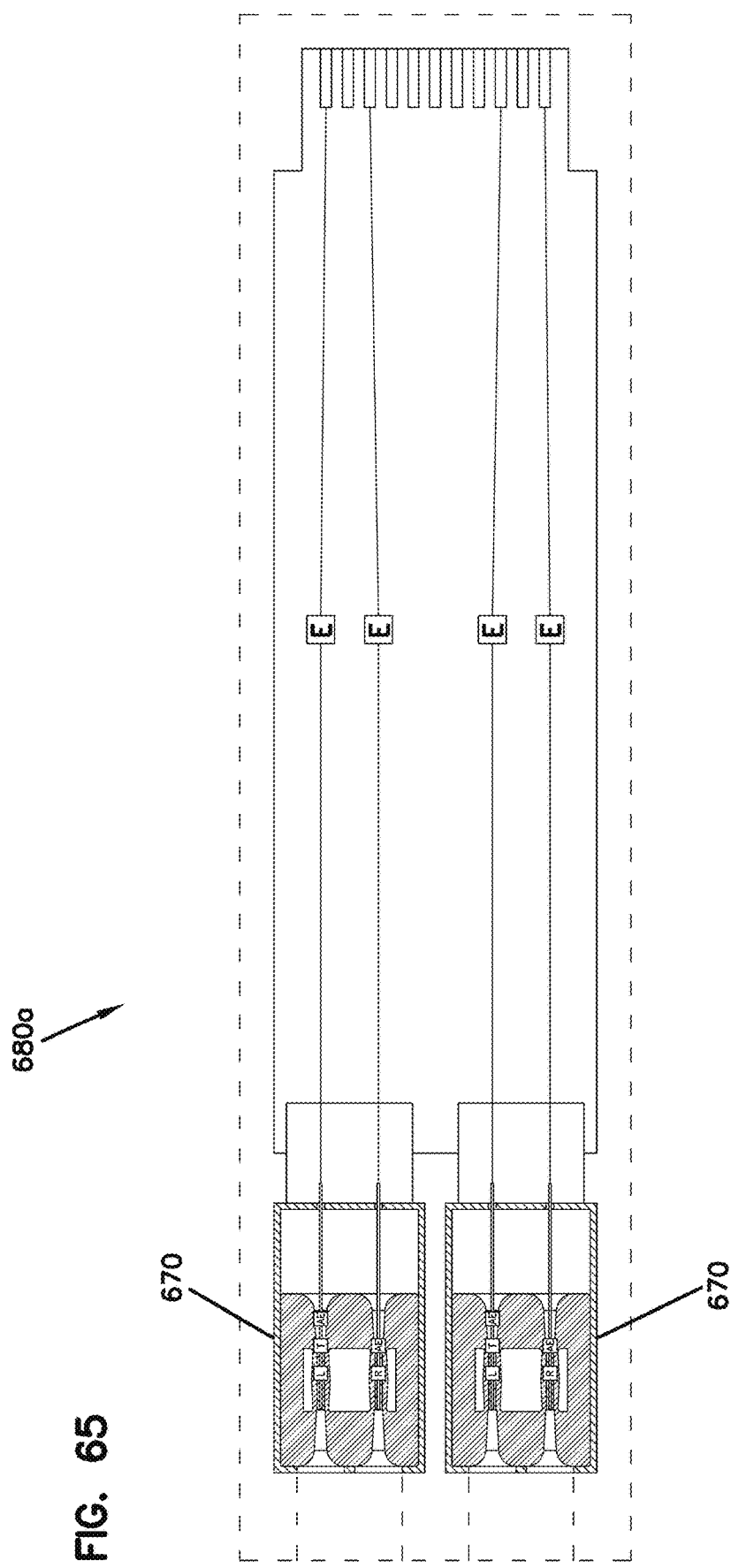
FIG. 65 depicts an optical transceiver module in accordance with the principles of the present disclosure incorporating two of the combined receiver and transceiver optical subassemblies of FIG. 63.

FIG. 65 shows another transceiver module 680a in accordance with the principles of the present disclosure. Transceiver modules 680a has the same structure as the transceiver module 680 except the TROSAs 660 have been replaced with the TROSAs 670.

Aspects of the present disclosure also relate to additional arrangements and configurations for increasing the density of a transceiver module. In certain examples, the total surface area of a circuit board of a transceiver module can be utilized by offsetting TOSAs and ROSAs from an end of the circuit board. Instead, fiber optic connector interfaces can be provided at an end of a printed circuit board of a transceiver module, and optical fibers can be used to convey optical signals from the connector interface location to ROSAs and TOSAs that are offset or remote from the connector interface location.

Figure 66:
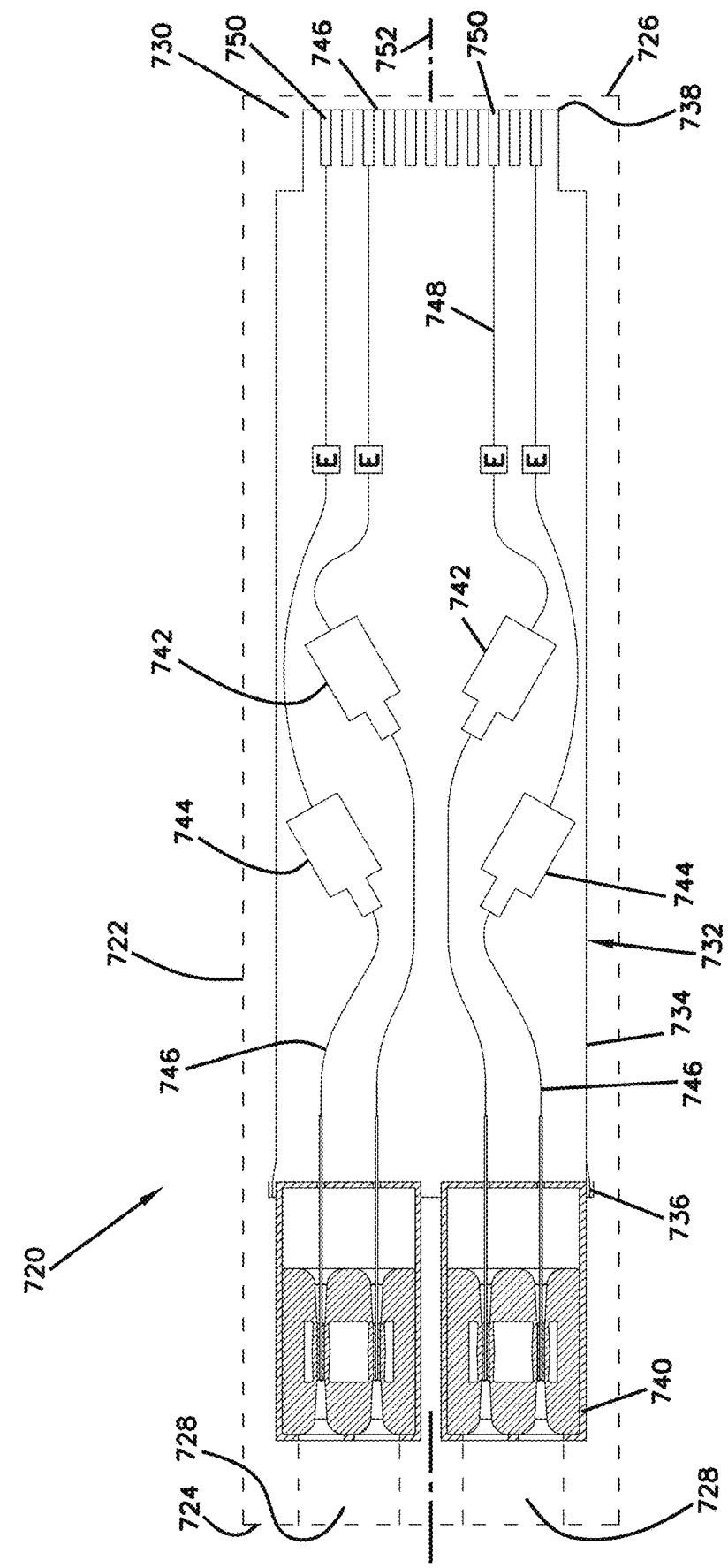
FIG. 66 depicts an optical transceiver module in accordance with the principles of the present disclosure having receiver optical subassemblies and transmitter optical subassemblies mounted on a circuit board at locations offset from an optical connection interface of the optical transceiver module, the optical subassemblies are oriented in an angled configuration.

FIG. 66 shows a transceiver module 720 in accordance with the principles of the present disclosure. Transceiver module 720 includes an outer housing 722. In one example, the outer housing 722 can have a metallic construction, but dielectric constructions are also contemplated. The outer housing 722 has an elongated configuration that extends between a first end 724 and a second end 726. Fiber optic connector ports 728 are defined at the first end 724 of the outer housing 722. An electrical connector port or opening 730 is provided at the second end 726 of the outer housing 722. An internal component 732 is mounted within the outer housing 722. The internal component 732 includes an elongated circuit board 734 having a length that extends between a first end 736 and an opposite second end 738. Fiber optic connector interface structures 740 are mounted at the first end 736 of the printed circuit boards 734. The fiber optic connector interface structures 740 can align with the fiber optic connector ports 728 and can include structure for receiving and aligning optical fibers of the fiber optic connectors received within the connector port 728. It will be appreciated that the fiber optic connector interface structures 740 can include ferrule-less fiber alignment structures such as those previously described or referenced herein. Additionally, it is also contemplated that ferrule alignment structures can also be used. The internal component 732 also includes a plurality of ROSAs 742 and TOSAs 744 mounted on the printed circuit board 734 at locations offset or remote from the fiber optic connector interface structures 740. For example, the ROSAs 742 and TOSAs 744 can be positioned or mounted at intermediate locations along the length of the printed circuit board 734. It will be appreciated that the ROSAs 742 can have a more conventional structure including ferrule alignment sleeves for receiving ferrules or can have a ferrule-less fiber interface structures as described herein. Optical fibers 746 are used to transfer signals from the fiber optic connector interface structures 740 to the remotely located ROSAs 742 and TOSAs 744. The internal component 732 also includes an electrical connector 746 (e.g., card edge connector) located at the second end 738 of the printed circuit board 734. Conductive pathways 748 on the printed circuit board 734 electrically connect the ROSAs 742 and the TOSAs 744 to corresponding electrical contacts 750 of the electrical connector 746. Electronics for processing signals conveyed on the electrical pathways 748 can also be mounted on the printed circuit board 734.

In the example of FIG. 66, the printed circuit board 734 can be divided in half by an axis 752 that bisects the printed circuit board 634 in a longitudinal direction. One ROSA 742 and one TOSA 744 (e.g., ROSA/TOSA pairs) are located on each side of the axis 752. The ROSAs 742 and the TOSAs 744 are angled at oblique angles relative to the central axis 752. Fiber receiving structures of the ROSAs and the TOSAs face generally toward the fiber optic connector interface structures 740.

Figure 67:
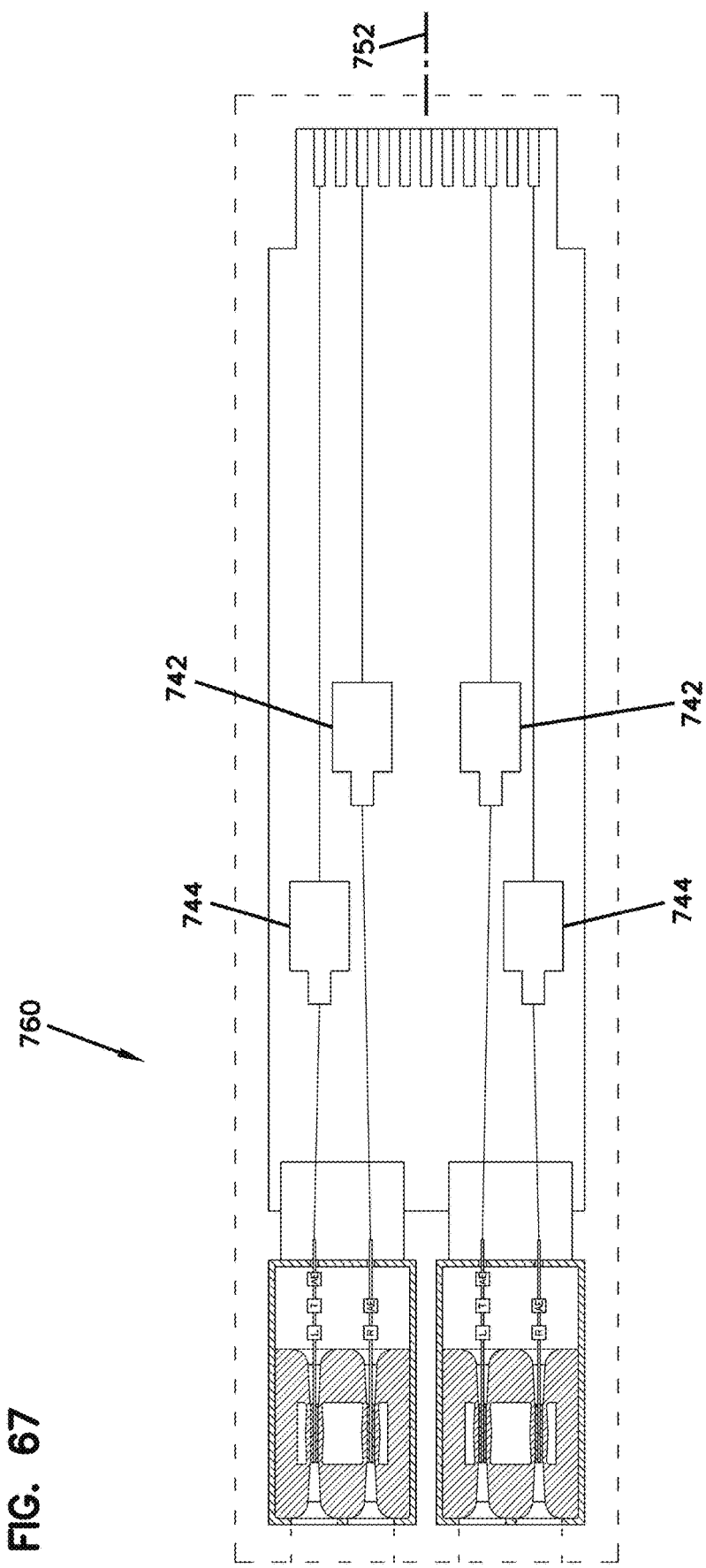
FIG. 67 depicts another optical transceiver module in accordance with the principles of the present disclosure having receiver optical subassemblies and transmitter optical subassemblies offset from an optical connection interface of the optical transceiver module, the optical subassemblies are arranged in a staggered configuration on a circuit board.

FIG. 67 shows another transceiver module 760 in accordance with the principles of the present disclosure. The transceiver module 760 has the same basic components as the transceiver module 720. As shown at FIG. 67, the ROSAs 742 and the TOSAs 744 are arranged in a staggered configuration with one ROSA/TOSA pair located on each side of the central axis 752. However, unlike the TOSA/ROSA arrangement of the transceiver module 720, the ROSAs 742 and the TOSAs 744 of the transceiver module 760 are not oriented in a canted or angled configuration relative to the axis 752. Instead, each of the ROSAs 742 and the TOSAs 744 has its central axis oriented generally parallel to the central axis 752.

Figure 68:
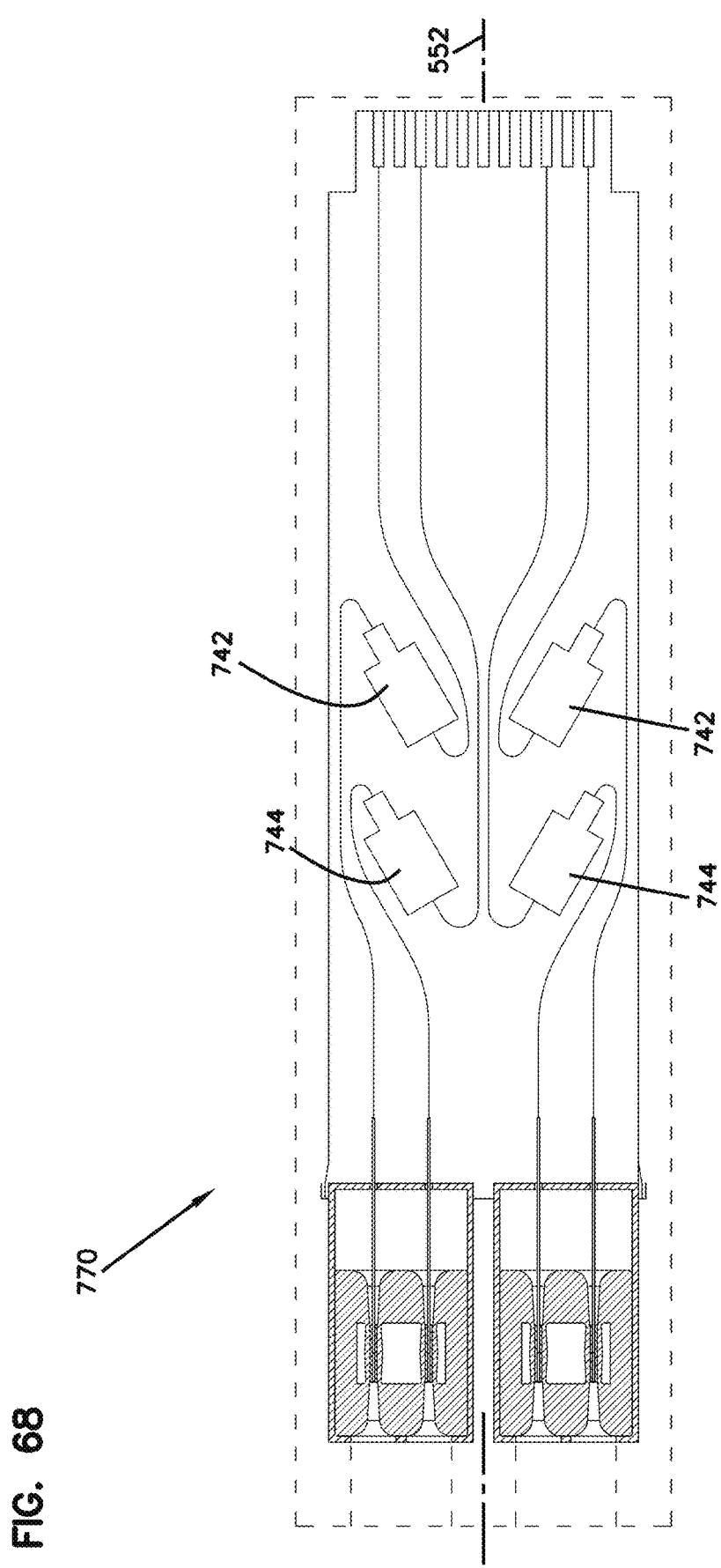
FIG. 68 depicts another optical transceiver module in accordance with the principles of the present disclosure, the optical transceiver module includes receiver optical subassemblies and transmitter optical subassemblies that are offset from an optical connection interface of the optical transceiver module, the optical subassemblies are oriented in a reversed, angled configuration on a circuit board.

FIG. 68 shows another transceiver module 770 in accordance with the principles of the present disclosure. The transceiver module 770 has the same basic components as the transceiver module 720 except the ROSAs and the TOSAs have been arranged in a different configuration on the printed circuit board 734. For example, the fiber receiving sections of the ROSAs and the TOSAs 742, 744 are oriented to face away from the fiber optic connector interface structures 740. Similar to the transceiver module 720, the ROSAs 742 and the TOSAs 744 are canted or angled relative to the central axis 752. In one example, all of the optical fibers of the transceiver module 770 have the same length. Additionally, in certain examples, all of the conductive pathways 748 of the transceiver module 770 have the same length.

Various modifications and alterations of this disclosure will become apparent to those skilled in the art without departing from the scope and spirit of this disclosure, and it should be understood that the scope of this disclosure is not to be unduly limited to the illustrated examples set forth herein.

What is claimed is:

1. An optical transceiver module comprising:
   a housing having a first end and a second end;
   an optical interface at the first end and an electrical interface at the second end, the optical interface including a connector port and an optical fiber alignment structure adjacent to the connector port, the optical fiber alignment structure having a connector end and a non-connector end, the connector end receiving and aligning ferrule-less optical fibers of an optical fiber connector, wherein the optical fiber alignment structure has a first end and a second end, wherein the first end includes a first optical fiber interface that has a first optical fiber center-to-center spacing and the second end includes a second optical fiber interface that has a second optical fiber center-to-center spacing that is different from the first optical fiber center-to-center spacing;
   a receive component including an optical-to-electrical converter electrically connected to the electrical interface;
   a transmit component including an electrical-to-optical converter electrically connected to the electrical interface;
   a first optical fiber having a first end received within the non-connector end of the optical fiber alignment structure and a second end optically connected to the receive component; and
   a second optical fiber having a first end received within the non-connector end of the optical fiber alignment structure and a second end optically connected to the transmit component.

2. The optical transceiver module of claim 1, wherein the optical transceiver module is an SFP optical transceiver module.

3. A system comprising the optical transceiver module of claim 1 and a duplex fiber optic connector that interfaces with the connector port of the optical transceiver module, the duplex fiber optic connector comprising:
   a connector body including a front end; and
   only two connector optical fibers having ferrule-less free end portions at the front end of the connector body, the free end portions having end faces accessible at the front end of the connector body.

4. The system of claim 3, wherein the end faces of the only two connector optical fibers of the duplex fiber optic connector have a center-to-center spacing less than or equal to 1.25 millimeters.

5. The system of claim 3, wherein the end faces of the only two connector optical fibers of the duplex fiber optic connector have a center-to-center spacing less than or equal to 1.0 millimeters.

6. The system of claim 3, wherein the duplex fiber optic connector further comprises a protective dust cap protecting each of the optical fiber end faces of the only two connector optical fibers, the dust cap including a non-gaseous fluid in contact with each of the optical fiber end faces, the dust cap additionally including a vent.

7. The system of claim 6, wherein the dust cap includes an open side and a closed side, and wherein the vent extends through the closed side of the dust cap.

8. The system of claim 6, wherein the non-gaseous fluid includes a gel.

9. The system of claim 6, wherein the non-gaseous fluid at least partially fills and blocks the vent.

10. The system of claim 6, wherein a tip of each of the only two connector optical fibers is embedded in the non-gaseous fluid.

11. The system of claim 3, wherein the connector body of the duplex fiber optic connector has a defined form factor that accommodates a center-to-center spacing between the only two connector optical fibers that varies between a minimum center-to-center spacing and a maximum center-to-center spacing that is greater than or equal to two times the minimum center-to-center spacing.

12. The system of claim 3, wherein the connector body of the duplex fiber optic connector provides an adjustable center-to-center spacing for the only two connector optical fibers.

13. An optical transceiver module comprising:
a housing having a first end and a second end;
an optical interface at the first end and an electrical interface at the second end, the optical interface including a connector port and an optical fiber alignment structure adjacent to the connector port, the optical fiber alignment structure being adapted for aligning ferrule-less optical fibers;
a receive component including an optical-to-electrical converter electrically connected to the electrical interface;
a transmit component including an electrical-to-optical converter electrically connected to the electrical interface;
a first optical fiber having a first end received within the optical fiber alignment structure and a second end optically connected to the receive component; and
a second optical fiber having a first end received within the optical fiber alignment structure and a second end optically connected to the transmit component,
wherein the duplex fiber optic connector further comprises a protective dust cap protecting each of the optical fiber end faces of the only two connector optical fibers, the dust cap including a non-gaseous fluid in contact with each of the optical fiber end faces, the dust cap additionally including a vent.

14. The system of claim 13, wherein the dust cap includes an open side and a closed side, and wherein the vent extends through the closed side of the dust cap.

15. The system of claim 13, wherein the non-gaseous fluid includes a gel.

16. The system of claim 13, wherein the non-gaseous fluid at least partially fills and blocks the vent.

17. The system of claim 13, wherein a tip of each of the only two connector optical fibers is embedded in the non-gaseous fluid.

18. An optical transceiver module comprising:
a housing having a first end and a second end;
an optical interface at the first end and an electrical interface at the second end, the optical interface including a connector port and an optical fiber alignment structure adjacent to the connector port, the optical fiber alignment structure being adapted for aligning ferrule-less optical fibers;
a receive component including an optical-to-electrical converter electrically connected to the electrical interface;
a transmit component including an electrical-to-optical converter electrically connected to the electrical interface;
a first optical fiber having a first end received within the optical fiber alignment structure and a second end optically connected to the receive component; and
a second optical fiber having a first end received within the optical fiber alignment structure and a second end optically connected to the transmit component,
wherein the optical fiber alignment structure has a first end and a second end, wherein the first end includes a first optical fiber interface that has a first optical fiber center-to-center spacing and the second end includes a second optical fiber interface that has a second optical fiber center-to-center spacing that is different from the first optical fiber center-to-center spacing.

19. An optical transceiver module comprising:
a housing having a first end and a second end;
an optical interface at the first end and an electrical interface at the second end, the optical interface including a connector port and an optical fiber alignment structure adjacent to the connector port, the optical fiber alignment structure being adapted for aligning ferrule-less optical fibers;
a receive component including an optical-to-electrical converter electrically connected to the electrical interface;
a transmit component including an electrical-to-optical converter electrically connected to the electrical interface;
a first optical fiber having a first end received within the optical fiber alignment structure and a second end optically connected to the receive component; and
a second optical fiber having a first end received within the optical fiber alignment structure and a second end optically connected to the transmit component,
wherein the duplex fiber optic connector comprises:
a connector body including a front end; and
only two connector optical fibers having ferrule-less free end portions at the front end of the connector body, the free end portions having end faces accessible at the front end of the connector body, and
wherein the connector body of the duplex fiber optic connector has a defined form factor that accommodates a center-to-center spacing between the only two connector optical fibers that varies between a minimum center-to-center spacing and a maximum center-to-center spacing that is greater than or equal to two times the minimum center-to-center spacing.

20. An optical transceiver module comprising:
a housing having a first end and a second end;
an optical interface at the first end and an electrical interface at the second end, the optical interface including a connector port and an optical fiber alignment structure adjacent to the connector port, the optical fiber alignment structure being adapted for aligning ferrule-less optical fibers;
a receive component including an optical-to-electrical converter electrically connected to the electrical interface;
a transmit component including an electrical-to-optical converter electrically connected to the electrical interface;
a first optical fiber having a first end received within the optical fiber alignment structure and a second end optically connected to the receive component; and
a second optical fiber having a first end received within the optical fiber alignment structure and a second end optically connected to the transmit component,
wherein the duplex fiber optic connector comprises:
a connector body including a front end; and
only two connector optical fibers having ferrule-less free end portions at the front end of the connector body, the free end portions having end faces accessible at the front end of the connector body, and wherein the connector body of the duplex fiber optic connector provides an adjustable center-to-center spacing for the only two connector optical fibers.

21. A system comprising:
an optical transceiver module including:
  a housing having a first end and a second end;
  an optical interface at the first end and an electrical interface at the second end, the optical interface including a connector port and an optical fiber alignment structure adjacent to the connector port, the optical fiber alignment structure having a connector end and a non-connector end, the connector end receiving and aligning ferrule-less optical fibers of an optical fiber connector;
  a receive component including an optical-to-electrical converter electrically connected to the electrical interface;
  a transmit component including an electrical-to-optical converter electrically connected to the electrical interface;
  a first optical fiber having a first end received within the non-connector end of the optical fiber alignment structure and a second end optically connected to the receive component;
  a second optical fiber having a first end received within the non-connector end of the optical fiber alignment structure and a second end optically connected to the transmit component; and
a duplex fiber optic connector that interfaces with the connector port of the optical transceiver module, the duplex fiber optic connector including:
  a connector body including a front end;
  only two connector optical fibers having ferrule-less free end portions at the front end of the connector body, the free end portions having end faces accessible at the front end of the connector body; and
  a protective dust cap protecting each of the optical fiber end faces of the only two connector optical fibers, the dust cap including a non-gaseous fluid in contact with each of the optical fiber end faces, the dust cap additionally including a vent.

22. The system of claim 21, wherein the dust cap includes an open side and a closed side, and wherein the vent extends through the closed side of the dust cap.

23. The system of claim 21, wherein the non-gaseous fluid includes a gel.

24. The system of claim 21, wherein the non-gaseous fluid at least partially fills and blocks the vent.

25. The system of claim 21, wherein a tip of each of the only two connector optical fibers is embedded in the non-gaseous fluid.

26. A system comprising:
an optical transceiver module including:
  a housing having a first end and a second end;
  an optical interface at the first end and an electrical interface at the second end, the optical interface including a connector port and an optical fiber alignment structure adjacent to the connector port, the optical fiber alignment structure having a connector end and a non-connector end, the connector end receiving and aligning ferrule-less optical fibers of an optical fiber connector;
  a receive component including an optical-to-electrical converter electrically connected to the electrical interface;
  a transmit component including an electrical-to-optical converter electrically connected to the electrical interface;
  a first optical fiber having a first end received within the non-connector end of the optical fiber alignment structure and a second end optically connected to the receive component;
  a second optical fiber having a first end received within the non-connector end of the optical fiber alignment structure and a second end optically connected to the transmit component; and
a duplex fiber optic connector that interfaces with the connector port of the optical transceiver module, the duplex fiber optic connector including:
  a connector body including a front end; and
  only two connector optical fibers having ferrule-less free end portions at the front end of the connector body, the free end portions having end faces accessible at the front end of the connector body,
  wherein the connector body of the duplex fiber optic connector has a defined form factor that accommodates a center-to-center spacing between the only two connector optical fibers that varies between a minimum center-to-center spacing and a maximum center-to-center spacing that is greater than or equal to two times the minimum center-to-center spacing.

27. A system comprising:
an optical transceiver module including:
  a housing having a first end and a second end;
  an optical interface at the first end and an electrical interface at the second end, the optical interface including a connector port and an optical fiber alignment structure adjacent to the connector port, the optical fiber alignment structure having a connector end and a non-connector end, the connector end receiving and aligning ferrule-less optical fibers of an optical fiber connector;
  a receive component including an optical-to-electrical converter electrically connected to the electrical interface;
  a transmit component including an electrical-to-optical converter electrically connected to the electrical interface;
  a first optical fiber having a first end received within the non-connector end of the optical fiber alignment structure and a second end optically connected to the receive component;
  a second optical fiber having a first end received within the non-connector end of the optical fiber alignment structure and a second end optically connected to the transmit component; and
a duplex fiber optic connector that interfaces with the connector port of the optical transceiver module, the duplex fiber optic connector including:
  a connector body including a front end; and
  only two connector optical fibers having ferrule-less free end portions at the front end of the connector body, the free end portions having end faces accessible at the front end of the connector body,
  wherein the connector body of the duplex fiber optic connector provides an adjustable center-to-center spacing for the only two connector optical fibers.

* * * * *